US012646216B2

(12) United States Patent
Kaneko et al.

(10) Patent No.: US 12,646,216 B2
(45) Date of Patent: Jun. 2, 2026

(54) INFORMATION PROCESSING DEVICE, BIOLOGICAL SAMPLE OBSERVATION SYSTEM, AND IMAGE GENERATION METHOD

(71) Applicant: Sony Group Corporation, Tokyo (JP)

(72) Inventors: Noe Kaneko, Kanagawa (JP);
Hirokazu Tatsuta, Kanagawa (JP);
Kazuhiro Nakagawa, Saitama (JP);
Sakiko Yasukawa, Tokyo (JP);
Noriyuki Kishii, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 260 days.

(21) Appl. No.: 18/561,150

(22) PCT Filed: Feb. 16, 2022

(86) PCT No.: PCT/JP2022/006169
§ 371 (c)(1),
(2) Date: Nov. 15, 2023

(87) PCT Pub. No.: WO2022/249583
PCT Pub. Date: Dec. 1, 2022

(65) Prior Publication Data
US 2024/0371042 A1 Nov. 7, 2024

(30) Foreign Application Priority Data

May 26, 2021 (JP) ................................. 2021-088623

(51) Int. Cl.
*G06T 7/90* (2017.01)
*G01N 21/64* (2006.01)

(52) U.S. Cl.
CPC ........... *G06T 7/90* (2017.01); *G01N 21/6428* (2013.01); *G01N 21/6456* (2013.01);
(Continued)

(58) Field of Classification Search
CPC ............ G06T 7/90; G06T 2207/10024; G01N 21/6428; G01N 21/6456; G01N 2021/6439
See application file for complete search history.

(56) References Cited

U.S. PATENT DOCUMENTS 7,932,502 B2 * 4/2011 Kubo ................. A61B 1/00186
250/459.1
8,107,158 B2 * 1/2012 Yamazaki ............ A61B 1/0005
356/73

(Continued)

FOREIGN PATENT DOCUMENTS

JP 2004-112772 A 4/2004
JP 2018-185524 A 11/2018
(Continued)

OTHER PUBLICATIONS

Maric et al, Whole-brain tissue mapping toolkit using largescale highly multiplexed immunofluorescence imaging and deep neural networks, Mar. 10, 2021, Nature Communications, https://doi.org/10.1038/s41467-021-21735-x, 12 pages ( Year: 2021).*

(Continued)

*Primary Examiner* — Mohammed H Zuberi
(74) *Attorney, Agent, or Firm* — Wolf, Greenfield & Sacks, P.C.

(57) ABSTRACT
An information processing device according to an aspect of the present disclosure includes a simulated image generation unit (131*a*) that generates a simulated image by superimposing a non-stained image including an autofluorescence component and a dye tile image in which a reference spectrum of a first fluorescent dye and imaging noise of each of pixels of the non-stained image are associated, a fluorescence separation unit (131*b*) that separates a component of the first fluorescent dye and the autofluorescence component on the basis of the simulated image and generates a sepa- (Continued)

rated image, and an evaluation unit (131*c*) that evaluates a degree of separation of the separated image.

20 Claims, 20 Drawing Sheets

(52) U.S. Cl.
CPC ............... *G01N 2021/6439* (2013.01); *G06T 2207/10024* (2013.01); *G06T 2207/10064* (2013.01); *G06T 2207/20072* (2013.01); *G06T 2207/30024* (2013.01)

(56) References Cited

U.S. PATENT DOCUMENTS

| | | | | |
|---|---|---|---|---|
| 8,169,471 | B2 * | 5/2012 | Yamaguchi | ............ A61B 1/045 348/370 |
| 8,214,025 | B2 * | 7/2012 | Takaoka | ............... A61B 5/0071 600/478 |
| 9,128,055 | B2 * | 9/2015 | Sekino | ............... G01N 21/6428 |
| 9,516,235 | B2 * | 12/2016 | Shida | ........................ G06T 7/12 |
| 9,686,484 | B2 * | 6/2017 | Lee | ....................... A61B 5/0036 |
| 9,949,645 | B2 * | 4/2018 | Shida | ..................... A61B 1/043 |
| 10,684,458 | B2 * | 6/2020 | Chung | ............... G02B 21/0072 |
| 10,729,310 | B2 * | 8/2020 | Takahashi | ............ A61B 1/0676 |
| 10,750,929 | B2 * | 8/2020 | Mitamura | .............. H04N 23/84 |
| 11,439,468 | B2 * | 9/2022 | Ikehara | ................... G06T 7/248 |
| 2004/0044275 | A1 | 3/2004 | Hakamata | |
| 2005/0163359 | A1 | 7/2005 | Murao et al. | |
| 2006/0247535 | A1 * | 11/2006 | Sendai | ................. A61B 1/0638 600/476 |
| 2007/0273877 | A1 * | 11/2007 | Kawano | ............. G01N 21/6458 356/318 |
| 2009/0245611 | A1 * | 10/2009 | Can | ...................... G06V 20/695 382/133 |
| 2012/0269723 | A1 * | 10/2012 | Brinkmann | ........ A61K 49/0058 424/1.49 |
| 2013/0044126 | A1 * | 2/2013 | Yamada | .................... G06T 5/50 345/629 |
| 2015/0098126 | A1 | 4/2015 | Keller et al. | |
| 2015/0257635 | A1 * | 9/2015 | Kubo | ................. A61B 1/00186 600/109 |
| 2017/0234795 | A1 | 8/2017 | Issadore et al. | |
| 2018/0252702 | A1 * | 9/2018 | Irudayaraj | ............ A61K 49/223 |
| 2020/0327657 | A1 * | 10/2020 | Klaiman | .................. G06T 5/50 |
| 2024/0053267 | A1 * | 2/2024 | Ikeda | ................. G01N 21/6456 |
| 2024/0371042 | A1 * | 11/2024 | Kaneko | .............. G01N 21/6428 |

FOREIGN PATENT DOCUMENTS

| | | |
|---|---|---|
| JP | 2020-020791 A | 2/2020 |
| JP | 2020-180976 A | 11/2020 |
| WO | WO 2004/042392 A1 | 5/2004 |

OTHER PUBLICATIONS

International Search Report and English translation thereof mailed Apr. 12, 2022 in connection with International Application No. PCT/JP2022/006169.

* cited by examiner

PARTIALLY
ENLARGED
VIEW

GOOD EXAMPLE OF SEPARATED IMAGE

PARTIALLY
ENLARGED
VIEW

POOR EXAMPLE (1) OF SEPARATED IMAGE
(AUTOFLUORESCENCE LEAKAGE)

PARTIALLY ENLARGED VIEW

POOR EXAMPLE (2) OF SEPARATED IMAGE
(AUTOFLUORESCENCE LEAKAGE)

Signal separation VALUE FOR EACH DYE

DETECTION LIMIT
Signal Separation
=1.645

INFORMATION PROCESSING DEVICE, BIOLOGICAL SAMPLE OBSERVATION SYSTEM, AND IMAGE GENERATION METHOD

CROSS-REFERENCE TO RELATED APPLICATIONS

This application claims the benefit under 35 U.S.C. § 371 as a U.S. National Stage Entry of International Application No. PCT/JP2022/006169, filed in the Japanese Patent Office as a Receiving Office on Feb. 16, 2022, which claims priority to Japanese Patent Application Number JP2021-088623, filed in the Japanese Patent Office on May 26, 2021, each of which is hereby incorporated by reference in its entirety.

FIELD

The present disclosure relates to an information processing device, a biological sample observation system, and an image generation method.

BACKGROUND

In biofluorescence imaging, a color separation technology for separating stained fluorescence and unintended autofluorescence derived from biological tissue is required. For example, in a multiplex fluorescence imaging technology, in order to spectrally separate autofluorescence and extract target stained fluorescence, a color separation technology using a method such as a least squares method or non-negative matrix factorization has been developed (see, for example, Patent Literature 1).

CITATION LIST

Patent Literature

Patent Literature 1: JP 2020-020791 A

SUMMARY

Technical Problem

However, since the evaluation of the color separation accuracy is only visual qualitative evaluation, it is difficult to evaluate between algorithms, and it is not possible to perform quantitative evaluation. The reason why this quantitative evaluation cannot be performed is that correct evaluation cannot be performed under a staining condition in which a dye luminance level is not large with respect to overlapping of dyes or autofluorescence, and comparison between different samples is difficult because an autofluorescence spectrum varies depending on a living tissue site. Thus, an evaluation system for quantitatively evaluating the color separation accuracy, that is, appropriately evaluating the degree of fluorescence separation is required.

Accordingly, the present disclosure proposes an information processing device, a biological sample observation system, and an image generation method capable of appropriately evaluating the degree of fluorescence separation.

Solution to Problem

An information processing device, according to the embodiment of the present disclosure includes: a simulated image generation unit that generates a simulated image by superimposing a non-stained image including an autofluorescence component and a dye tile image in which a reference spectrum of a first fluorescent dye and imaging noise of each of pixels of the non-stained image are associated; a fluorescence separation unit that separates a component of the first fluorescent dye and the autofluorescence component on the basis of the simulated image and generates a separated image; and an evaluation unit that evaluates a degree of separation of the separated image.

A biological sample observation system, according to the embodiment of the present disclosure includes: an imaging device that acquires a non-stained image including an autofluorescence component; and an information processing device that processes the non-stained image, wherein the information processing device includes a simulated image generation unit that generates a simulated image by superimposing the non-stained image and a dye tile image in which a reference spectrum of a first fluorescent dye and imaging noise of each of pixels of the non-stained image are associated, a fluorescence separation unit that separates a component of the first fluorescent dye and the autofluorescence component on the basis of the simulated image and generates a separated image, and an evaluation unit that evaluates a degree of separation of the separated image.

An image generation method, according to the embodiment of the present disclosure includes generating a simulated image by superimposing a non-stained image including an autofluorescence component and a dye tile image in which a reference spectrum of a first fluorescent dye and imaging noise of each of pixels of the non-stained image are associated.

BRIEF DESCRIPTION OF DRAWINGS

FIG. 1 is a diagram showing an example of a schematic configuration of an information processing system according to a first embodiment.

FIG. 4 is a diagram for describing an example of a method for generating a connected fluorescence spectrum according to the first embodiment.

FIG. 6 is a diagram for describing generation of a simulated image according to the first embodiment.

DESCRIPTION OF EMBODIMENTS

Figure 2:
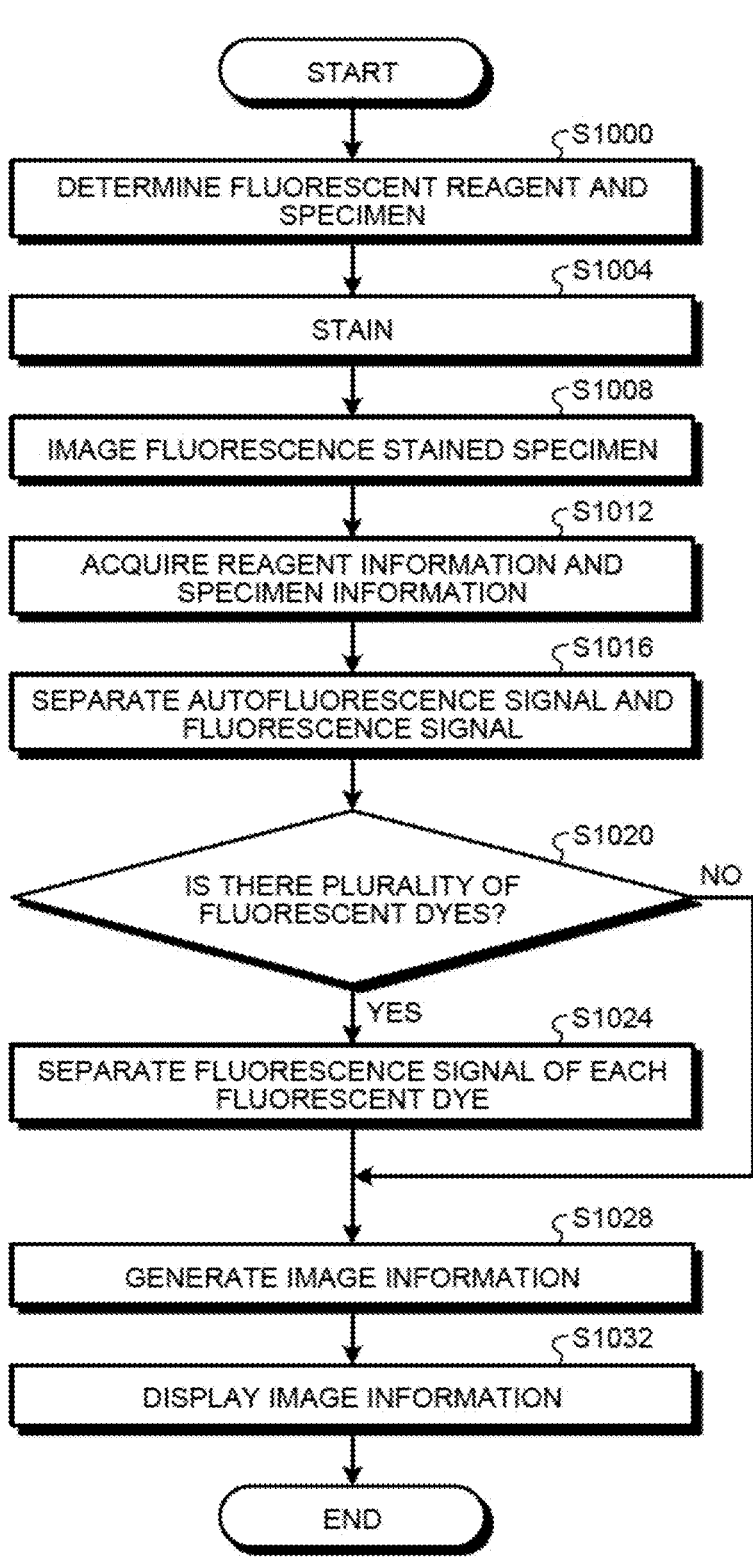
FIG. 2 is a flowchart showing an example of a flow of processing by an information processing device according to the first embodiment.

Hereinafter, an embodiment of the present disclosure will be described in detail with reference to the drawings. Note that the apparatus, the system, the method, and the like according to the present disclosure are not limited by the embodiment. Further, in the present description and the drawings, components having substantially the same functional configuration are basically denoted by the same reference numerals, and redundant description is omitted.

One or more embodiments (examples and modifications) described below can each be implemented independently. On the other hand, at least some of the plurality of embodiments described below may be appropriately combined with at least some of other embodiments. The plurality of embodiments may include novel features different from each other. Therefore, the plurality of embodiments can contribute to solving different objects or problems, and can exhibit different effects.

The present disclosure will be described according to the following order of items.

1. First Embodiment
1-1. Configuration example of information processing system
1-2. Processing example of information processing device
1-3. Processing example of fluorescence separation
1-4. Configuration example of analysis unit related to quantitative evaluation
1-5. Processing example of simulated image creation
1-6. Processing example of quantitative evaluation
1-7. Image example of separated image
1-8. Image example of evaluation result image
1-9. Application example
1-10. Operation and effect
2. Second Embodiment
2-1. Configuration example of analysis unit related to quantitative evaluation
2-2. Operation and effect
3. Other Embodiments
4. Application Example
5. Configuration example of hardware
6. Appendix

1. First Embodiment

<1-1. Configuration Example of Information Processing System>

Figure 1:
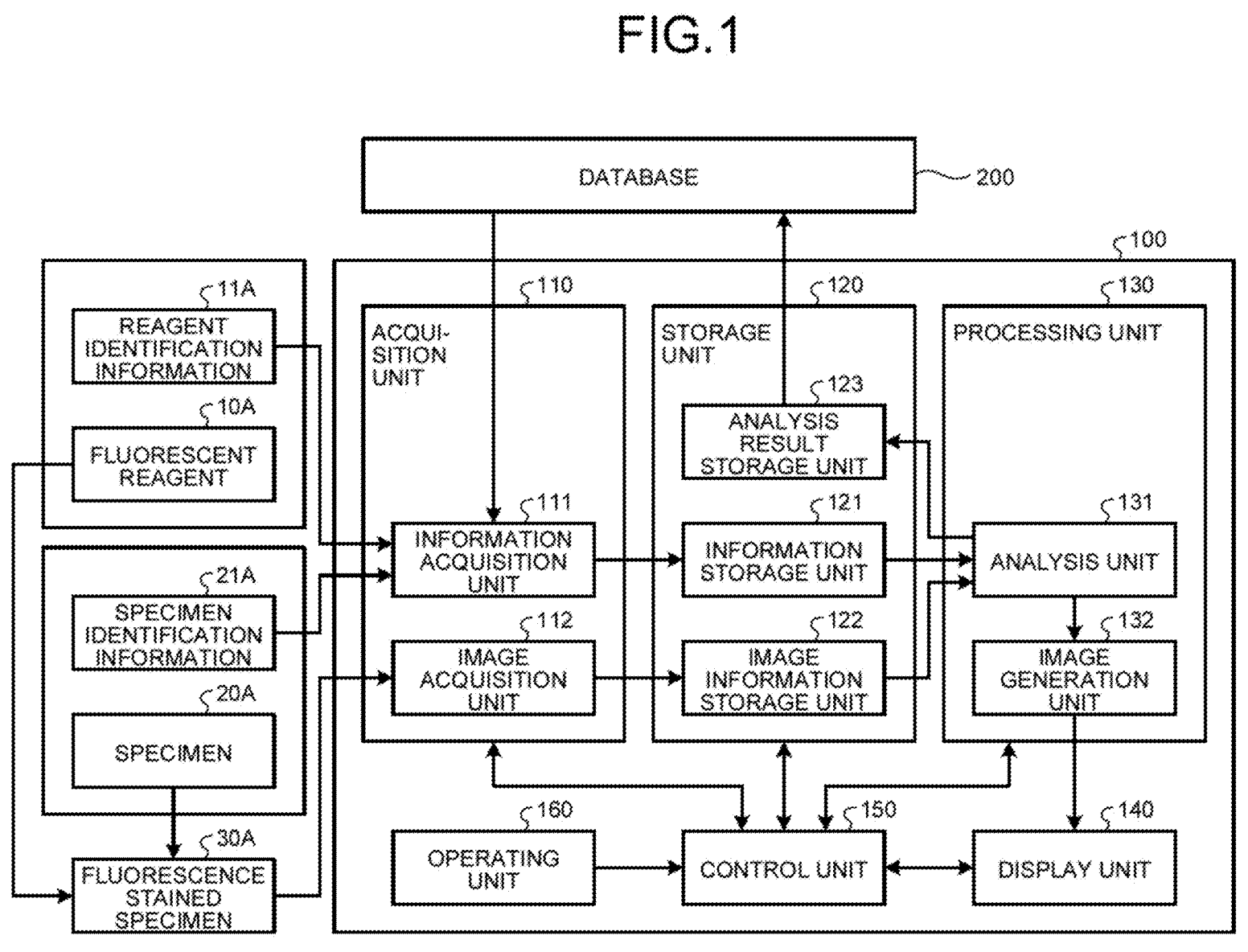

A configuration example of an information processing system according to the present embodiment will be described with reference to FIG. 1. FIG. 1 is a diagram showing an example of a schematic configuration of an information processing system according to the present embodiment. The information processing system is an example of a biological sample observation system.

As shown in FIG. 1, the information processing system according to the present embodiment includes an information processing device 100 and a database 200. As inputs to the information processing system, there are a fluorescent reagent 10A, a specimen 20A, and a fluorescence stained specimen 30A.

(Fluorescent Reagent 10A)

The fluorescent reagent 10A is a chemical used for staining the specimen 20A. The fluorescent reagent 10A is, for example, a fluorescent antibody (primary antibodies used for direct labeling or secondary antibodies used for indirect labeling), a fluorescent probe, a nuclear staining reagent, or the like, but the type of the fluorescent reagent 10A is not particularly limited thereto. Further, the fluorescent reagent 10A is managed with identification information (hereinafter referred to as "reagent identification information 11A") that can identify the fluorescent reagent 10A (and the production lot of the fluorescent reagent 10A). The reagent identification information 11A is, for example, bar code information (one-dimensional bar code information, two-dimensional bar code information, or the like), but is not limited thereto. The properties of the fluorescent reagent 10A are different for each production lot depending on the production method, the state of cells from which the antibody is acquired, and the like even for the same (same type of) products. For example, in the fluorescent reagent 10A, spectrum information, quantum yield, or fluorescent labeling rate (also referred to as "F/P value: Fluorescein/Protein" and refers to the number of fluorescent molecules that label an antibody) or the like is different for each production lot. Therefore, in the information processing system according to the present embodiment, the fluorescent reagent 10A is managed for each production lot by being attached with the reagent identification information 11A (in other words, reagent information of each fluorescent reagent 10A is managed for each production lot). Thus, the information processing device 100 can separate a fluorescence signal and an auto-fluorescence signal in consideration of a slight difference in property appearing for each production lot. Note that the management of the fluorescent reagent 10A in units of production lots is merely an example, and the fluorescent reagent 10A may be managed in units finer than the production lots.

(Specimen 20A)

The specimen 20A is prepared for the purpose of pathological diagnosis, clinical examination, or the like from a specimen or a tissue sample collected from a human body. For the specimen 20A, the type of the tissue being used (for example, an organ or a cell), the type of disease of interest, the attributes of the subject (for example, age, sex, blood type, or race), or the subject's daily habits (for example, an eating habit, an exercise habit, or a smoking habit) are not particularly limited. Further, the specimen 20A is managed with identification information (hereinafter referred to as "specimen identification information 21A") that can identify each specimen 20A. As is the reagent identification information 11A, the specimen identification information 21A is, for example, bar code information (one-dimensional bar code information, two-dimensional bar code information, or the like), but is not limited thereto. The properties of the specimen 20A vary depending on the type of the tissue being used, the type of the target disease, the attributes of the subject, the daily habits of the subject, or the like. For example, in the specimen 20A, a measurement channel, spectrum information, and the like varies depending on the type of the tissue being used, and the like. Accordingly, in the information processing system according to the present embodiment, the specimen 20A is individually managed by being attached with the specimen identification information 21A. Thus, the information processing device 100 can separate the fluorescence signal and the autofluorescence signal in consideration of a slight difference in property appearing for each specimen 20A.

(Fluorescence Stained Specimen 30A)

The fluorescence stained specimen 30A is prepared by staining the specimen 20A with the fluorescent reagent 10A. In the present embodiment, it is assumed that, in the fluorescence stained specimen 30A, the specimen 20A is stained with at least one fluorescent reagent 10A, but the number of fluorescent reagents 10A used for staining is not particularly limited. Further, the staining method is determined by a combination of each of the specimen 20A and the fluorescent reagent 10A, and the like, and is not particularly limited. The fluorescence stained specimen 30A is input to the information processing device 100 and imaged.

(Information Processing Device 100)

As shown in FIG. 1, the information processing device 100 includes an acquisition unit 110, a storage unit 120, a processing unit 130, a display unit 140, a control unit 150, and an operating unit 160.

(Acquisition Unit 110)

The acquisition unit 110 is configured to acquire information used for various processes of the information processing device 100. As shown in FIG. 1, the acquisition unit 110 includes an information acquisition unit 111 and an image acquisition unit 112.

(Information Acquisition Unit 111)

The information acquisition unit 111 is configured to acquire the reagent information and specimen information. More specifically, the information acquisition unit 111 acquires the reagent identification information 11A attached to the fluorescent reagent 10A used for generating the fluorescence stained specimen 30A and the specimen identification information 21A attached to the specimen 20A. For example, the information acquisition unit 111 acquires the reagent identification information 11A and the specimen identification information 21A using a barcode reader or the like. Then, the information acquisition unit 111 acquires the reagent information on the basis of the reagent identification information 11A and the specimen information on the basis of the specimen identification information 21A from the database 200. The information acquisition unit 111 stores the acquired information in an information storage unit 121 described later.

(Image Acquisition Unit 112)

The image acquisition unit 112 is configured to acquire image information of the fluorescence stained specimen 30A (the specimen 20A stained with at least one fluorescent reagent 10A). More specifically, the image acquisition unit 112 includes any imaging element (for example, a CCD, a CMOS, or the like), and acquires the image information by imaging the fluorescence stained specimen 30A using the imaging element. Here, it should be noted that the "image information" is a concept including not only the image of the fluorescence stained specimen 30A itself but also a measurement value that is not visualized as an image. For example, the image information may include information regarding a wavelength spectrum (hereinafter referred to as fluorescence spectrum) of the fluorescence emitted from the fluorescence stained specimen 30A. The image acquisition unit 112 stores the image information in an image information storage unit 122 described later.

(Storage Unit 120)

The storage unit 120 is configured to store (save) information used for various processes of the information processing device 100 or information output by the various processes. As shown in FIG. 1, the storage unit 120 includes an information storage unit 121, an image information storage unit 122, and an analysis result storage unit 123.

(Information Storage Unit 121)

The information storage unit 121 is configured to store the reagent information and the specimen information acquired by the information acquisition unit 111. Note that, after an analysis process by an analysis unit 131 and a generation process of the image information by an image generation unit 132 (a reconstruction process of the image information) which will be described later is finished, the information storage unit 121 may increase the free space by deleting the reagent information and the specimen information used for the process.

(Image Information Storage Unit 122)

The image information storage unit 122 is configured to store the image information of the fluorescence stained specimen 30A acquired by the image acquisition unit 112. Note that, after the analysis process by the analysis unit 131 and the generation process of the image information by the image generation unit 132 (the reconstruction process of the image information) is finished, as does the information storage unit 121, the image information storage unit 122 may increase the free space by deleting the image information used for the process.

(Analysis Result Storage Unit 123)

The analysis result storage unit 123 is configured to store a result of the analysis process performed by the analysis unit 131 described later. For example, the analysis result storage unit 123 stores the fluorescence signal of the fluorescent reagent 10A or the autofluorescence signal of the specimen 20A separated by the analysis unit 131. In addition, the analysis result storage unit 123 separately provides the result of the analysis process to the database 200 in order to improve analysis accuracy by machine learning or the like. Note that, after providing the result of the analysis process to the database 200, the analysis result storage unit 123 may increase the free space by appropriately deleting the result of the analysis process stored therein.

(Processing Unit 130)

The processing unit 130 is a functional configuration that performs various processes using the image information, the reagent information, and the specimen information. As shown in FIG. 1, the processing unit 130 includes the analysis unit 131 and the image generation unit 132.

(Analysis Unit 131)

The analysis unit 131 is configured to perform various analysis processes using the image information, the specimen information, and the reagent information. For example, the analysis unit 131 performs processing of separating the autofluorescence signal of the specimen 20A and the fluorescence signal of the fluorescent reagent 10A from the image information on the basis of the specimen information and the reagent information.

More specifically, the analysis unit 131 recognizes one or more elements constituting the autofluorescence signal on the basis of the measurement channel included in the specimen information. For example, the analysis unit 131 recognizes one or more autofluorescence components constituting the autofluorescence signal. Then, the analysis unit 131 predicts the autofluorescence signal included in the image information using the spectrum information of these autofluorescence components included in the specimen information. Then, the analysis unit 131 separates the autofluorescence signal and the fluorescence signal from the image information on the basis of the spectrum information of the fluorescence component of the fluorescent reagent 10A included in the reagent information and the predicted autofluorescence signal.

Here, when the specimen 20A is stained with two or more fluorescent reagents 10A, the analysis unit 131 separates the fluorescence signal of each of these two or more fluorescent reagents 10A from the image information (or the fluorescence signal after being separated from the autofluorescence signal) on the basis of the specimen information and the reagent information. For example, the analysis unit 131 separates the fluorescence signal of each of the fluorescent reagents 10A from the entire fluorescence signal after being separated from the autofluorescence signal by using the spectrum information of the fluorescence component of each of the fluorescent reagents 10A included in the reagent information.

In addition, in a case where the autofluorescence signal is constituted by two or more autofluorescence components, the analysis unit 131 separates the autofluorescence signal of each autofluorescence component from the image information (or the autofluorescence signal after being separated from the fluorescence signal) on the basis of the specimen information and the reagent information. For example, the analysis unit 131 separates the autofluorescence signal of each autofluorescence component from the entire autofluorescence signal after being separated from the fluorescence signal by using the spectrum information of each autofluorescence component included in the specimen information.

The analysis unit 131 that has separated the fluorescence signal and the autofluorescence signal performs various processes using these signals. For example, the analysis unit 131 may extract the fluorescence signal from the image information of the other specimen 20A by performing a subtraction process (also referred to as a "background subtraction process") on the image information of the other specimen 20A using the autofluorescence signal after separation. In a case where there is a plurality of specimens 20A that is the same or similar in terms of the tissue being used for the specimen 20A, the type of the target disease, the attributes of the subject, the daily habit of the subject, and the like, there is a high possibility that the autofluorescence signals of these specimens 20A are similar. The similar specimen 20A mentioned here includes, for example, a tissue section before staining of a tissue section to be stained (hereinafter referred to as a section), a section adjacent to a stained section, a section different from a stained section in the same block (sampled from the same place as the stained section), or a section in a different block in the same tissue (sampled from a different place from the stained section) or the like), a section sampled from a different patient, or the like. Therefore, when the autofluorescence signal can be extracted from a certain specimen 20A, the analysis unit 131 may extract the fluorescence signal from the image information of the other specimen 20A by removing the autofluorescence signal from the image information of the other specimen 20A. Furthermore, when calculating the S/N value using the image information of the other specimen 20A, the analysis unit 131 can improve the S/N value by using the background after removing the autofluorescence signal.

In addition to the background subtraction process, the analysis unit 131 can perform various processes using the fluorescence signal or autofluorescence signal after separation. For example, the analysis unit 131 can analyze the fixation state of the specimen 20A using these signals, and can perform segmentation (or region division) for recognizing a region of an object (for example, a cell, intracellular structure (cytoplasm, cell membrane, nucleus, or the like), or tissue (tumor site, non-tumor site, connective tissue, blood vessel, blood vessel wall, lymphatic vessel, fibrosed structure, necrosis, and the like)) included in the image information. Analysis and segmentation of the fixation state of the specimen 20A will be described in detail later.

(Image Generation Unit 132)

The image generation unit 132 is configured to generate (reconstruct) the image information on the basis of the fluorescence signal or the autofluorescence signal separated by the analysis unit 131. For example, the image generation unit 132 can generate the image information including only the fluorescence signal or generate the image information including only the autofluorescence signal. At that time, in a case where the fluorescence signal is constituted by a plurality of fluorescence components or the autofluorescence signal is constituted by a plurality of autofluorescence components, the image generation unit 132 can generate the image information in units of respective components. Furthermore, in a case where the analysis unit 131 performs various processes (for example, analysis of the fixation state of the specimen 20A, segmentation, calculation of the S/N value, or the like) using the fluorescence signal or the autofluorescence signal after separation, the image generation unit 132 may generate the image information indicating a result of the process. With this configuration, distribution information of the fluorescent reagent 10A labeled with a target molecule or the like, that is, a two-dimensional spread and intensity of fluorescence, a wavelength, and a positional relationship thereof are visualized, and in particular, in a tissue image analysis region in which information of a target substance is complicated, the visibility of a doctor or a researcher who is the user can be improved.

In addition, the image generation unit 132 may perform control to distinguish the fluorescence signal with respect to the autofluorescence signal on the basis of the fluorescence signal or the autofluorescence signal separated by the analysis unit 131, and generate the image information. Specifically, the image information may be generated by performing control of improving the luminance of the fluorescence spectrum of the fluorescent reagent 10A labeled with the target molecule or the like, extracting and changing the color of only the fluorescence spectrum of the labeled fluorescent reagent 10A, extracting the fluorescence spectrum of two or more fluorescent reagents 10A from the specimen 20A labeled with two or more fluorescent reagents 10A and changing the color of each of them to another color, extracting and dividing or subtracting only the autofluorescence spectrum of the specimen 20A, improving the dynamic range, and the like. Thus, the user can clearly distinguish color information derived from the fluorescent reagent bound to the target substance, and the visibility of the user can be improved.

(Display Unit 140)

The display unit 140 is configured to present the image information generated by the image generation unit 132 to the user by displaying the image information on the display. Note that the type of display used as the display unit 140 is not particularly limited. In addition, although not described in detail in the present embodiment, the image information generated by the image generation unit 132 may be presented to the user by being projected by a projector or printed by a printer (in other words, a method of outputting the image information is not particularly limited).

(Control Unit 150)

The control unit 150 is a functional configuration that comprehensively controls overall processing performed by the information processing device 100. For example, the control unit 150 controls the start, end, and the like of various processes (for example, imaging process, analysis process, generation process of image information (reconstruction process of image information), display process of image information, and the like of the fluorescence stained specimen 30A) as described above on the basis of an operation input by the user performed via the operating unit 160. Note that the control content of the control unit 150 is not particularly limited. For example, the control unit 150 may control processing generally performed in a general-purpose computer, a PC, a tablet PC, or the like (for example, processing related to an operating system (OS)).

(Operating Unit 160)

The operating unit 160 is configured to receive an operation input from a user. More specifically, the operating unit 160 includes various input units such as a keyboard, a mouse, a button, a touch panel, or a microphone, and the user can perform various inputs to the information processing device 100 by operating these input units. Information regarding the operation input performed via the operating unit 160 is provided to the control unit 150.

(Database 200)

The database 200 is a device that manages the specimen information, the reagent information, and results of the analysis process. More specifically, the database 200 manages the specimen identification information 21A and the specimen information and the reagent identification information 11A and the reagent information in association with each other. Thus, the information acquisition unit 111 can acquire the specimen information on the basis of the specimen identification information 21A of the specimen 20A to be measured and the reagent information from the database 200 on the basis of the reagent identification information 11A of the fluorescent reagent 10A.

As described above, the specimen information managed by the database 200 is information including the measurement channel and the spectrum information unique to the autofluorescence component included in the specimen 20A. However, in addition to these, the specimen information may include target information for each specimen 20A, specifically, information regarding the type of the tissue being used (for example, an organ, a cell, blood, a body fluid, ascites, or pleural effusion), the type of disease to be a target, attributes of the subject (for example, age, sex, blood type, or race), or the subject's daily habits (for example, an eating habit, an exercise habit, or a smoking habit), and the information including the measurement channel and the spectrum information unique to the autofluorescence component included in the specimen 20A and the target information may be associated with each specimen 20A. Thus, the information including the measurement channel and the spectrum information unique to the autofluorescence component included in the specimen 20A can be easily traced from the target information, and for example, the analysis unit 131 can be caused to execute a similar separation process performed in the past from the similarity of the target information in the plurality of specimens 20A, so that the measurement time can be shortened. Note that, the "tissue being used" is not particularly limited to a tissue collected from the subject, and may include an in vivo tissue or a cell line of a human, an animal, or the like, and a solution, a solvent, a solute, and a material contained in an object to be measured.

Further, the reagent information managed by the database 200 is information including the spectrum information of the fluorescent reagent 10A as described above, but in addition to this, the reagent information may include information regarding the fluorescent reagent 10A, such as a production lot, a fluorescence component, an antibody, a clone, a fluorescent labeling rate, a quantum yield, a fading coefficient (information indicating easiness of reducing the fluorescence intensity of the fluorescent reagent 10A), and an absorption cross-sectional area (or a molar absorption coefficient). Furthermore, the specimen information and the reagent information managed by the database 200 may be managed in different configurations, and in particular, the information regarding the reagent may be a reagent database that presents an optimal combination of reagents to the user.

Here, it is assumed that the specimen information and the reagent information are provided from a producer (manufacturer) or the like, or are independently measured in the information processing system according to the present disclosure. For example, the manufacturer of the fluorescent reagent 10A often does not measure and provide spectrum information, a fluorescent labeling rate, and the like for each production lot. Therefore, by uniquely measuring and managing these pieces of information in the information processing system according to the present disclosure, the separation accuracy of the fluorescence signal and the autofluorescence signal can be improved. In addition, in order to simplify the management, the database 200 may use a catalog value disclosed by a producer (manufacturer) or the like, a document value described in various documents, or the like as the specimen information and the reagent information (particularly the reagent information). However, in general, since the actual specimen information and reagent information are often different from the catalog value and the document value, it is more preferable that the specimen information and the reagent information are uniquely measured and managed in the information processing system according to the present disclosure as described above.

In addition, accuracy of the analysis process (for example, a separation process of the fluorescence signal and the autofluorescence signal, and the like) can be improved by a machine learning technique using the specimen information, the reagent information, and the results of the analysis process managed in the database 200. The subject that performs learning using the machine learning technique or the like is not particularly limited, but in the present embodiment, a case where the analysis unit 131 of the information processing device 100 performs learning will be described as an example. For example, by using a neural network, the analysis unit 131 generates a classifier or an estimator machine-learned with learning data in which the fluorescence signal and the autofluorescence signal after separation are associated with the image information, the specimen information, and the reagent information used for separation. Then, in a case where the image information, the specimen information, and the reagent information are newly acquired, the analysis unit 131 can predict and output the fluorescence signal and the autofluorescence signal included in the image information by inputting these pieces of information to the classifier or the estimator.

In addition, similar separation processes performed in the past (separation process using similar image information, specimen information, or reagent information) with higher accuracy than the predicted fluorescence signal and autofluorescence signal may be calculated, the contents of processing (information, parameters, and the like used for the processing) in the processes may be statistically or regressively analyzed, and a method of improving the separation process of the fluorescence signal and the autofluorescence signal on the basis of the analysis result may be output. Note that the machine learning method is not limited to the above, and a known machine learning technique can be used. In addition, the separation process of the fluorescence signal and the autofluorescence signal may be performed by artificial intelligence. Further, not only the separation process of the fluorescence signal and the autofluorescence signal but also various processes using the fluorescence signal or the autofluorescence signal after separation (for example, analysis of the immobilization state of the specimen 20A, segmentation, or the like) may be improved by the machine learning technique or the like.

The configuration example of the information processing system according to the present embodiment has been described above. Note that the above-described configuration described with reference to FIG. 1 is merely an example, and the configuration of the information processing system according to the present embodiment is not limited to such an example. For example, the information processing device 100 may not necessarily include all of the functional configurations shown in FIG. 1. In addition, the information processing device 100 may include the database 200 therein. The functional configuration of the information processing device 100 can be flexibly modified according to specifications and operations.

In addition, the information processing device 100 may perform processing other than the processing described above. For example, when the reagent information includes information such as the quantum yield, the fluorescent labeling rate, and the absorption cross-sectional area (or the molar absorption coefficient) related to the fluorescent reagent 10A, the information processing device 100 may calculate the number of fluorescent molecules, the number of antibodies bound to fluorescent molecules, or the like in the image information by using the image information from which the autofluorescence signal has been removed and the reagent information.

<1-2. Processing Example of Information Processing Device>

A processing example of the information processing device 100 according to the present embodiment will be described with reference to FIG. 2. FIG. 2 is a flowchart showing an example of a processing flow of the information processing device 100 according to the present embodiment. As shown in FIG. 2, in step S1000, the user determines a fluorescent reagent 10A and a specimen 20A to be used for analysis. In step S1004, the user stains the specimen 20A using the fluorescent reagent 10A to prepare a fluorescence stained specimen 30A.

In step S1008, the image acquisition unit 112 of the information processing device 100 images the fluorescence stained specimen 30A to acquire image information. In step S1012, the information acquisition unit 111 acquires the reagent information and the specimen information from the database 200 on the basis of the reagent identification information 11A attached to the fluorescent reagent 10A used for generating the fluorescence stained specimen 30A and the specimen identification information 21A attached to the specimen 20A.

In step S1016, the analysis unit 131 separates the autofluorescence signal of the specimen 20A and the fluorescence signal of the fluorescent reagent 10A from the image information on the basis of the specimen information and the reagent information. Here, when the fluorescence signal includes signals of a plurality of fluorescent dyes (step S1020/Yes), the analysis unit 131 separates the fluorescence signal of each fluorescent dye in step S1024. Note that, when the signals of the plurality of fluorescent dyes are not included in the fluorescence signal (step S1020/No), the separation process of the fluorescence signal of each fluorescent dye is not performed in step S1024.

In step S1028, the image generation unit 132 generates image information using the fluorescence signal separated by the analysis unit 131. For example, the image generation unit 132 generates image information in which the autofluorescence signal is removed from the image information, or generates image information in which the fluorescence signal is displayed for each fluorescent dye. In step S1032, the display unit 140 displays the image information generated by the image generation unit 132, whereby the series of processing ends.

Note that each step in the flowchart of FIG. 2 is not necessarily processed in time series in the described order. That is, each step in the flowchart may be processed in an order different from the described order or may be processed in parallel.

For example, after separating the autofluorescence signal of the specimen 20A and the fluorescence signal of the fluorescent reagent 10A from the image information in step S1016, the analysis unit 131 may directly separate the fluorescence signal of each fluorescent dye from the image information instead of separating the fluorescence signal of each fluorescent dye in step S1024. In addition, after separating the fluorescence signal of each fluorescent dye from the image information, the analysis unit 131 may separate the autofluorescence signal of the specimen 20A from the image information.

In addition, the information processing device 100 may also execute processing not shown in FIG. 2. For example, the analysis unit 131 may not only separate the signals, but also perform segmentation on the basis of the separated fluorescence signal or autofluorescence signal, or analyze the immobilization state of the specimen 20A.

<1-3. Processing Example of Fluorescence Separation>

Figure 3:
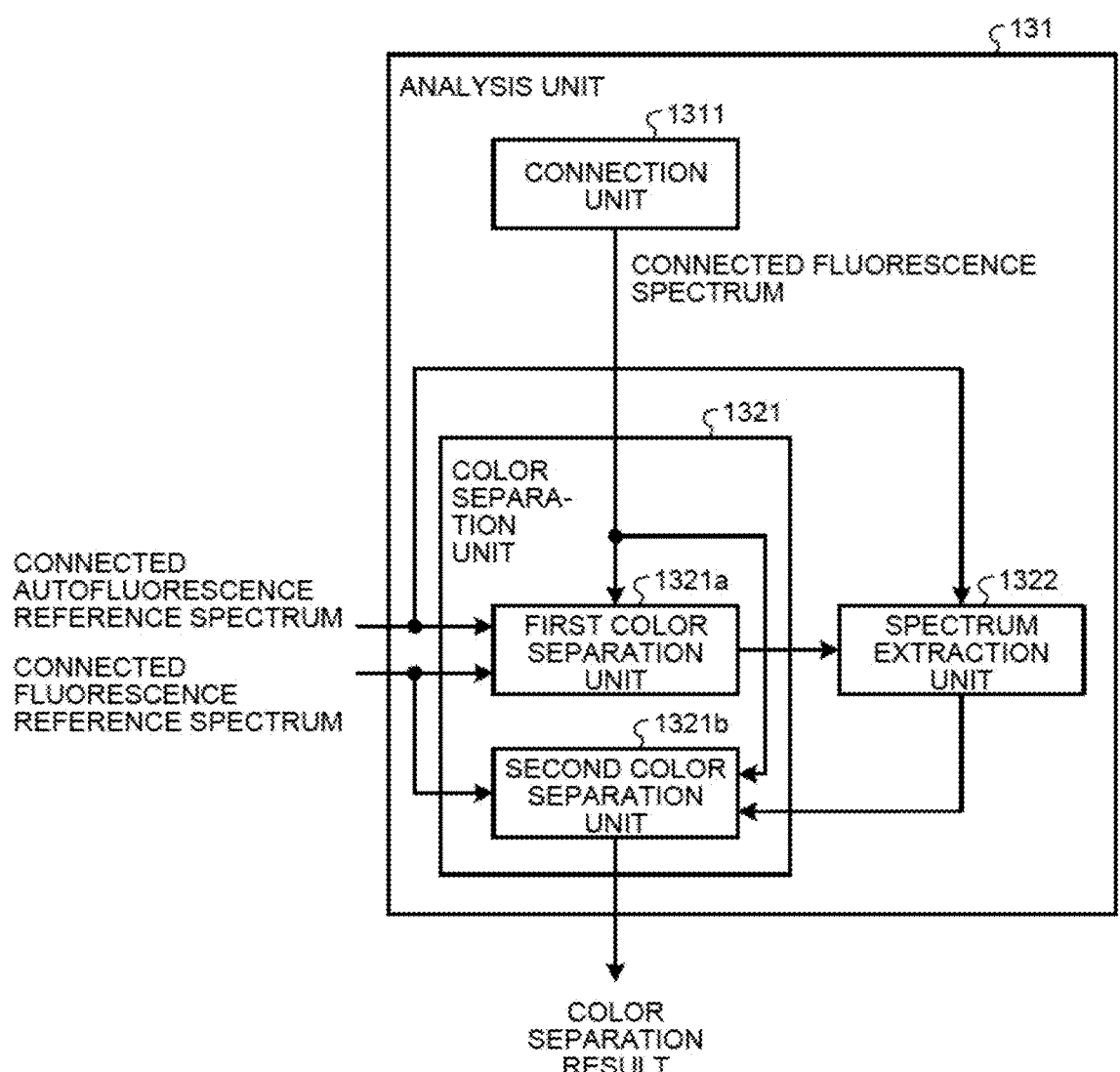
FIG. 3 is a diagram showing an example of a schematic configuration of an analysis unit according to the first embodiment.
Figure 4:
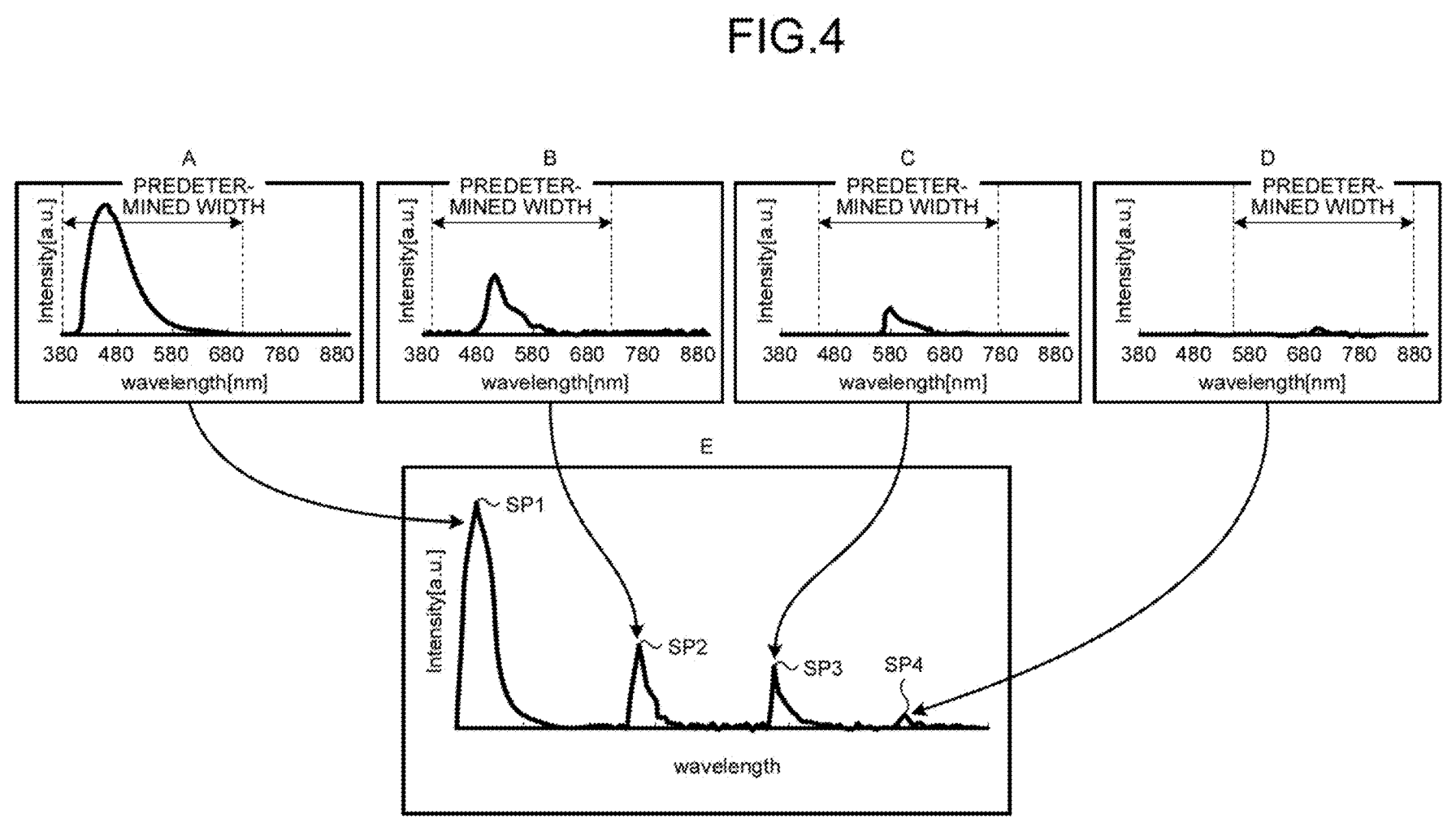

A processing example of fluorescence separation according to the present embodiment will be described with reference to FIGS. 3 and 4. FIG. 3 is a diagram showing an example of a schematic configuration of the analysis unit 131 according to the present embodiment. FIG. 4 is a diagram for describing an example of a method for generating a connected fluorescence spectrum according to the present embodiment.

As shown in FIG. 3, the analysis unit 131 includes a connection unit 1311, a color separation unit 1321, and a spectrum extraction unit 1322. The analysis unit 131 is configured to perform various processes including a fluorescence separation process. For example, the analysis unit 131 is configured to connect fluorescence spectra as preprocessing of the fluorescence separation process and separate the connected fluorescence spectrum for each molecule.

(Connection Unit 1311)

The connection unit 1311 is configured to generate the connected fluorescence spectrum by connecting at least a part of the plurality of fluorescence spectra acquired by the image acquisition unit 112 in the wavelength direction. For example, the connection unit 1311 extracts data of a predetermined width in each fluorescence spectrum so as to include the maximum value of fluorescence intensity in each of the four fluorescence spectra (A to D in FIG. 4) acquired by the image acquisition unit 112. The width of the wavelength band in which the connection unit 1311 extracts data can be determined on the basis of reagent information, an excitation wavelength, a fluorescence wavelength, or the like, and may be different for each fluorescent substance (in other words, the width of the wavelength band in which the connection unit 1311 extracts data may be different for each of the fluorescence spectra shown in A to D of FIG. 4). Then, as shown in E of FIG. 4, the connection unit 1311 generates one connected fluorescence spectrum by connecting the extracted data to each other in the wavelength direction. Note that, since the connected fluorescence spectrum includes data extracted from a plurality of fluorescence spectra, the wavelengths are not continuous at a boundary of connected pieces of data.

At this time, on the basis of intensity of excitation light, the connection unit 1311 performs the above-described connection after equalizing the intensity of excitation light corresponding to each of the plurality of fluorescence spectra (in other words, after correcting the plurality of fluorescence spectra). More specifically, the connection unit 1311 performs the above-described connection after equalizing the intensity of the excitation light corresponding to each of the plurality of fluorescence spectra by dividing each fluorescence spectrum by excitation power density that is the intensity of the excitation light. Thus, a fluorescence spectrum when irradiated with the excitation light having the same intensity is obtained. Further, in a case where the intensity of the excitation light to be irradiated is different, the intensity of a spectrum absorbed by the fluorescence stained specimen 30A (hereinafter referred to as an "absorption spectrum") is also different depending on the intensity. Therefore, as described above, the intensity of the excitation light corresponding to each of the plurality of fluorescence spectra is equalized, whereby the absorption spectrum can be appropriately evaluated.

Here, A to D of FIG. 4 are specific examples of the fluorescence spectrum acquired by the image acquisition unit 112. In A to D of FIG. 4, the fluorescence stained specimen 30A contains, for example, four fluorescent substances of DAPI, CK/AF488, PgR/AF594, and ER/AF647, and specific examples of fluorescence spectra acquired when the fluorescent substances are irradiated with excitation light having excitation wavelengths of 392 [nm] (A of FIG. 4), 470 [nm] (B of FIG. 4), 549 [nm] (C of FIG. 4), and 628 [nm] (D of FIG. 4) are shown. Note that the fluorescence wavelength is shifted to a longer wavelength side than the excitation wavelength due to emission of energy for fluorescence emission (Stokes shift). Further, the fluorescent substance contained in the fluorescence stained specimen

30A and the excitation wavelength of the excitation light to be irradiated are not limited to the above.

Specifically, the connection unit 1311 extracts a fluorescence spectrum SP1 in the wavelength band of the excitation wavelength of 392 nm or more and 591 nm or less from the fluorescence spectrum shown in A of FIG. 4, extracts a fluorescence spectrum SP2 in the wavelength band of the excitation wavelength of 470 nm or more and 669 nm or less from the fluorescence spectrum shown in B of FIG. 4, extracts a fluorescence spectrum SP3 in the wavelength band of the excitation wavelength of 549 nm or more and 748 nm or less from the fluorescence spectrum shown in C of FIG. 4, and extracts a fluorescence spectrum SP4 in the wavelength band of the excitation wavelength of 628 nm or more and 827 nm or less from the fluorescence spectrum shown in D of FIG. 4. Next, the connection unit 1311 corrects a wavelength resolution of the extracted fluorescence spectrum SP1 to 16 nm (without intensity correction), corrects the intensity of the fluorescence spectrum SP2 to 1.2 times and corrects the wavelength resolution thereof to 8 nm, corrects the intensity of the fluorescence spectrum SP3 to 1.5 times (without wavelength resolution correction), and corrects the intensity of the fluorescence spectrum SP4 to 4.0 times and corrects the wavelength resolution thereof to 4 nm. Then, the connection unit 1311 generates the connected fluorescence spectrum as shown in E of FIG. 4 by sequentially connecting the corrected fluorescence spectra SP1 to SP4.

Note that, although FIG. 4 shows a case where the fluorescence spectra SP1 to SP4 having a predetermined bandwidth (200 nm width in FIG. 4) are extracted from the excitation wavelength when the connection unit 1311 acquires each fluorescence spectrum and connected, the bandwidths of the fluorescence spectra extracted by the connection unit 1311 do not need to coincide with each other and may be different from each other. That is, the region extracted from each fluorescence spectrum by the connection unit 1311 may be a region including the peak wavelength of each fluorescence spectrum, and the wavelength band and the bandwidth may be appropriately changed. At that time, the shift of the spectrum wavelength due to the Stokes shift may be considered. As described above, the data amount can be reduced by narrowing down the wavelength band to be extracted, so that the fluorescence separation process can be executed at a higher speed.

In addition, the intensity of the excitation light in the present description may be excitation power or excitation power density as described above. The excitation power or the excitation power density may be power or a power density obtained by actually measuring the excitation light emitted from the light source, or may be power or a power density obtained from a drive voltage applied to the light source. Note that the intensity of the excitation light in the present description may be a value obtained by correcting the excitation power density with an absorption rate for each excitation light of the section to be observed or an amplification rate of a detection signal in a detection system that detects fluorescence emitted from the section (the image acquisition unit 112 or the like). That is, the intensity of the excitation light in the present description may be the power density of the excitation light actually contributing to the excitation of the fluorescent substance, a value obtained by correcting the power density with the amplification factor of the detection system, or the like. By considering the absorption rate, the amplification rate, and the like, it is possible to appropriately correct the intensity of the excitation light that changes according to the change in the machine state, the environment, and the like, so that it is possible to generate the connected fluorescence spectrum that enables color separation with higher accuracy.

Note that the correction value (also referred to as an intensity correction value) based on the intensity of the excitation light for each fluorescence spectrum is not limited to a value for equalizing the intensity of the excitation light corresponding to each of the plurality of fluorescence spectra, and may be variously modified. For example, signal intensity of a fluorescence spectrum having an intensity peak on the long wavelength side tends to be lower than signal intensity of a fluorescence spectrum having an intensity peak on the short wavelength side. Therefore, when the connected fluorescence spectrum includes both the fluorescence spectrum having the intensity peak on the long wavelength side and the fluorescence spectrum having the intensity peak on the short wavelength side, the fluorescence spectrum having the intensity peak on the long wavelength side is hardly considered, and only the fluorescence spectrum having the intensity peak on the short wavelength side may be extracted. In such a case, for example, by setting the intensity correction value for the fluorescence spectrum having the intensity peak on the long wavelength side to a larger value, it is also possible to enhance the separation accuracy of the fluorescence spectrum having the intensity peak on the short wavelength side.

(Color Separation Unit 1321)

The color separation unit 1321 includes, for example, a first color separation unit 1321*a* and a second color separation unit 1321*b*, and color-separates the connected fluorescence spectrum of the stained section input (also referred to as a stained sample) from the connection unit 1311 for each molecule.

More specifically, the first color separation unit 1321*a* executes a color separation process on the connected fluorescence spectrum of the stained sample input from the connection unit 1311 using a connected fluorescence reference spectrum included in the reagent information and a connected autofluorescence reference spectrum included in the specimen information input from the information storage unit 121, thereby separating the connected fluorescence spectrum into spectra for each molecule. Note that, for example, a least squares method (LSM), a weighted least squares method (WLSM), non-negative matrix factorization (NMF), non-negative matrix factorization using a Gram matrix $^t$AA, or the like may be used for the color separation process.

The second color separation unit 1321*b* executes the color separation process using the connected autofluorescence reference spectrum after adjustment that is input from the spectrum extraction unit 1322 on the connected fluorescence spectrum of the stained sample input from the connection unit 1311, thereby separating the connected fluorescence spectrum into spectra for each molecule. Note that, as with the first color separation unit 1321*a*, for example, a least squares method (LSM), a weighted least squares method (WLSM), non-negative matrix factorization (NMF), non-negative matrix factorization using a Gram matrix $^t$AA, or the like may be used for the color separation process.

Here, in the least squares method, for example, the color mixing ratio is calculated by fitting the connected fluorescence spectrum generated by the connection unit 1311 to the reference spectrum. In addition, in the weighted least squares method, weighting is performed so as to emphasize an error of a low signal level by utilizing the fact that noise of the connected fluorescence spectrum (Signal), which is a measured value, has a Poisson distribution. However, an upper limit value at which weighting is not performed by the weighted least squares method is set as an offset value. The offset value is determined by characteristics of a sensor used for measurement, and in a case where an imaging element is used as the sensor, it is necessary to separately optimize the offset value.

(Spectrum Extraction Unit 1322)

The spectrum extraction unit 1322 is a configuration for improving the connected autofluorescence reference spectrum so that a more accurate color separation result can be obtained, and adjusts the connected autofluorescence reference spectrum included in the specimen information input from the information storage unit 121 to one that can obtain a more accurate color separation result on the basis of the color separation result by the color separation unit 1321.

The spectrum extraction unit 1322 executes a spectrum extraction process using the color separation result input from the first color separation unit 1321*a* on the connected autofluorescence reference spectrum input from the information storage unit 121, and adjusts the connected autofluorescence reference spectrum on the basis of the result, thereby improving the connected autofluorescence reference spectrum to one that can obtain a more accurate color separation result. Note that, for the spectrum extraction process, for example, non-negative matrix factorization (NMF), singular value decomposition (SVD), or the like may be used.

Note that, in FIG. 3, the case where the adjustment of the connected autofluorescence reference spectrum is performed once has been exemplified, but the present invention is not limited thereto, and a process of inputting the color separation result by the second color separation unit 1321*b* to the spectrum extraction unit 1322 and executing the adjustment of the connected autofluorescence reference spectrum again in the spectrum extraction unit 1322 may be repeated one or more times, and then the final color separation result may be acquired.

As described above, the first color separation unit 1321*a* and the second color separation unit 1321*b* can output a unique spectrum as the separation result (the separation result is not divided for each excitation wavelength) by performing the fluorescence separation process using the reference spectra (the connected autofluorescence reference spectrum and the connected fluorescence reference spectrum) connected in the wavelength direction. Therefore, the implementer can more easily obtain the correct spectrum. In addition, since the reference spectrum (connected autofluorescence reference spectrum) related to autofluorescence used for separation is automatically acquired and the fluorescence separation process is performed, it is not necessary for the implementer to extract a spectrum corresponding to autofluorescence from an appropriate space of a non-stained section.

Here, conventionally, in order to quantitatively evaluate a color separation algorithm as described above (for example, the color separation accuracy or the like), there has been no method of performing quantitative evaluation on an actually stained image. The reasons for this include "1. in an image obtained by actually staining and capturing an image of a biological sample, it is not possible to determine where the dye has stained, and it is not possible to determine whether the dye and autofluorescence have been successfully separated (correct answer is unknown)", "2. a system that is used in FCM (flow cytometry) and creates a panel with good dye separability using the spectrum of a dye and wavelength resolution characteristics of a detection system cannot be used in a case where overlapping of dyes or an influence of autofluorescence is large", "3. in the system in which a panel is determined from an antigen expression rate, an antibody dye labeling rate, dye luminance, and excitation efficiency, the characteristics of autofluorescence vary depending on the tissue site, and thus cannot be used for spatial complex evaluation", and "4. in the above two systems, the spectral shape of the measurement autofluorescence, a level to be imparted, and a noise level of the measurement system are unknown and cannot be considered at the time of panel design".

Therefore, in order to perform quantitative evaluation such as a color separation algorithm, it is effective to use a simulated image. For example, in the present embodiment, a dye tile image (fluorescence image) is generated by superimposing, in a tile shape, a dye spectrum to which a noise characteristic corresponding to an imaging parameter is imparted on a non-stained image acquired by image capturing, and the dye tile image and the non-stained image are combined to create an image (simulated image) simulating actual measurement. Thus, staining conditions or the like in which the dye luminance level is not high with respect to autofluorescence can also be reproduced, and a dye and a pixel having autofluorescence can be distinguished. Consequently, the accuracy of color separation can be quantitatively obtained as a signal separation value from the average and variance of pixels. This quantitative evaluation is described in detail below.

<1-4. Configuration Example of Analysis Unit Related to Quantitative Evaluation>

Figure 5:
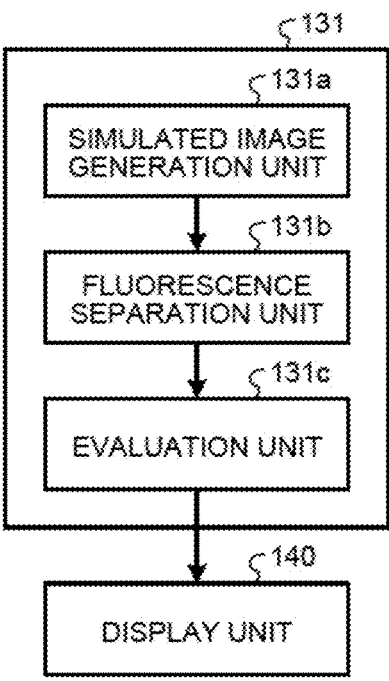
FIG. 5 is a diagram showing an example of a schematic configuration of the analysis unit according to the first embodiment.
Figure 6:
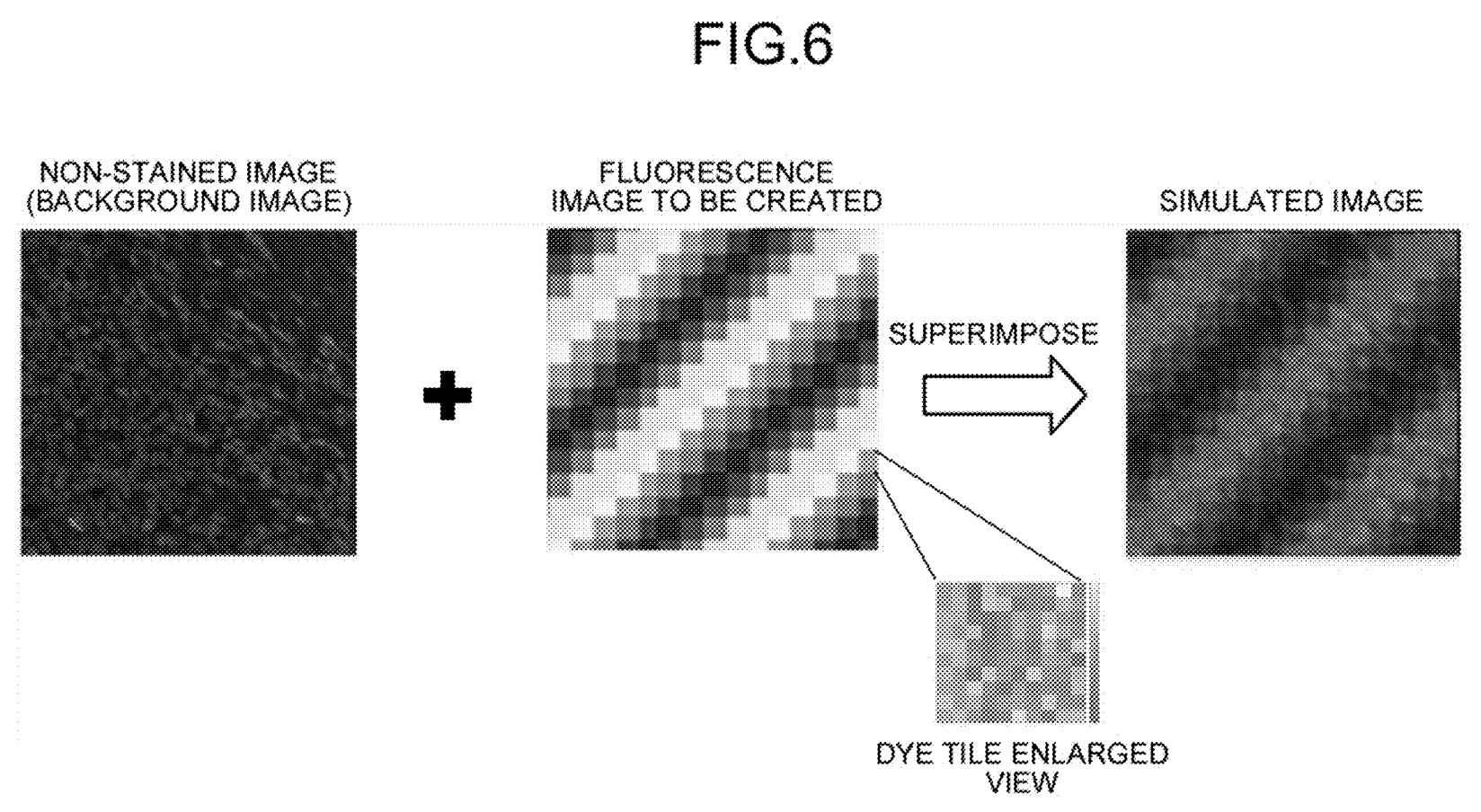
Figure 7:
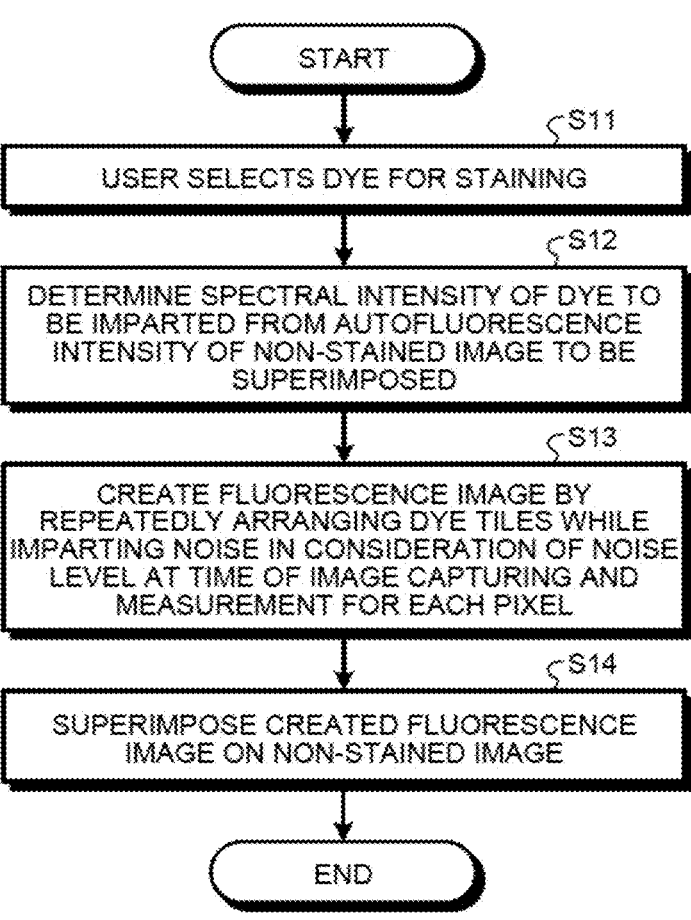
FIG. 7 is a flowchart showing an example of a flow of a simulated image generation process according to the first embodiment.

A configuration example of the analysis unit 131 according to the quantitative evaluation according to the present embodiment will be described with reference to FIGS. 5 and 6. FIG. 5 is a diagram showing an example of a schematic configuration of the analysis unit 131 according to the present embodiment. FIG. 6 is a diagram for describing generation of a simulated image according to the present embodiment.

As shown in FIG. 5, the analysis unit 131 includes a simulated image generation unit 131a, a fluorescence separation unit 131b, and an evaluation unit 131c. The fluorescence separation unit 131b corresponds to the color separation unit 1321.

As shown in FIG. 6, the simulated image generation unit 131a generates a simulated image by superimposing a non-stained image (background image) containing an autofluorescence component and a dye tile image (fluorescence image). The dye tile image is a dye tile group having a plurality of dye tiles. This dye tile image is, for example, an image in which a standard spectrum (reference spectrum) of a fluorescent dye (first fluorescent dye) and imaging noise for each pixel of a non-stained image are associated with each other.

For example, the intensity of the dye to be imparted to autofluorescence intensity of the non-stained image is determined from an antigen expression rate, an antibody labeling rate, dye excitation efficiency, dye luminous efficiency, and the like. The autofluorescence component is endogenous noise that is endogenous to the tissue sample. Examples of the endogenous noise include, in addition to the autofluorescence component of the non-stained image, a standard spectrum of another fluorescent dye (second fluorescent dye) of the non-stained image. Further, the imaging noise is, for example, noise that changes according to imaging conditions of the non-stained image, and the like. The degree of the imaging noise is quantified or visualized for each pixel. The imaging conditions of the non-stained image include, for example, laser power, gain, exposure time, and the like.

Examples of the imaging noise (measurement system noise) include "1. unnecessary signal noise due to autofluorescence", "2. random noise (for example, readout noise, dark current noise, and the like) caused by sensor circuit such as COMS", and "3. shot noise (random) increasing according to square root of detected charge amount". In order to simulate the imaging noise, the noise associated with, that is, imparted to the standard spectrum (the tile image) is mainly the shot noise of the above 3. This is because the above 1 and 2 are included in the non-stained image (autofluorescence image) of the background. By superimposing the tile and the background, it is possible to express all of 1 to 3 above of imaging noises (measurement system noise) to be simulated. The shot noise amount to be imparted in the above 3 can be determined from the number of photons (or the charge amount) of a dye signal to be imparted to the tile. For example, in the present embodiment, the charge amount of the non-stained image of the background is calculated, the charge amount of the dye is determined from the value, and the shot noise amount is further determined. Note that the shot noise is also called photon noise and is caused by physical fluctuation of the amount of photons reaching the sensor without taking a constant value. This shot noise is not eliminated no matter how much the circuit of the measurement system is improved.

Here, in the example of FIG. 6, the dye tile includes 10×10 pixels (pixels for display) (about 0.3 μm/pixel). This is a case where the non-stained image is taken at an image-capturing magnification of 20 times, and when the magnification is changed, it is necessary to change the size of the dye tile in accordance with the cell size. The size (volume) of one dye tile corresponds to the size of the cell, and the number of pixels of the dye tile image corresponds to the number of pixels of the cell size. The smallest unit of pixel is equal to the cell size. The dye tile image includes a standard spectrum for each of a plurality of types of dye tiles having different dyes, that is, a plurality of fluorescent dyes. Note that it is also possible to evaluate the color separation performance under a double staining condition or a triple staining condition by mixing a plurality of dyes in one dye tile instead of one dye in one dye tile.

In the example of FIG. 6, nine colors of dyes (dye tiles) are used. The color arrangement pattern of the dye tiles of nine colors is a pattern in which dye tiles of the same color are arranged in an oblique stripe shape, but is not limited thereto. For example, the color arrangement pattern of each dye tile may be a pattern in which dye tiles of the same color are arranged in a vertical stripe shape, a horizontal stripe shape, a checkered pattern, or the like, and may be a predetermined color arrangement pattern that defines which dye tile is located at which position.

Specifically, the simulated image generation unit 131a acquires a non-stained image (a non-stained tissue image) and an imaging parameter as input parameters. The imaging parameter is an example of imaging conditions, and include, for example, laser power, gain, exposure time, and the like. The simulated image generation unit 131a generates a dye tile by adding a noise characteristic corresponding to the imaging parameter to the dye spectrum, repeatedly arranges the dye tiles corresponding to the number of dyes desired for staining by the user, and generates a data set of the dye tile image.

The fluorescence separation unit 131b separates a component of the first fluorescent dye and the autofluorescence component on the basis of the simulated image generated by the simulated image generation unit 131a, and generates a separated image. The fluorescence separation unit 131*b* performs the color separation calculation on the simulated image (data set) to generate a separated image. Note that the fluorescence separation unit 131*b* is the color separation unit 1321 and performs the same processing as the color separation unit 1321. The color separation method includes, for example, LSM, NMF, and the like.

The evaluation unit 131*c* evaluates the degree of separation of the separated image generated by the fluorescence separation unit 131*b*. The evaluation unit 131*c* determines the degree of separation of the separated image (quality of the panel) from the average and variance of the color separation calculation results. For example, the evaluation unit 131*c* generates a histogram from the separated image, calculates a signal separation value between a dye and a signal other than the dye from the histogram, and evaluates the degree of separation on the basis of the signal separation value. As an example, the evaluation unit 131*c* represents positive and negative pixels separated in color by a histogram, and generates a graph indicating a signal separation value that is a numerical value of a calculation result of color separation accuracy.

The display unit 140 displays information indicating an evaluation result (for example, a signal separation value for each dye) of the evaluation unit 131*c* or an image. For example, the display unit 140 displays a graph, a diagram, or the like indicating the signal separation value for each dye generated by the evaluation unit 131*c*. Thus, the user can grasp the evaluation result of the evaluation unit 131*c*.

<1-5. Processing Example of Simulated Image Creation>

A processing example of simulated image creation according to the present embodiment will be described with reference to FIGS. 7 and 8. FIG. 7 is a flowchart showing an example of a flow of the simulated image generation process according to the present embodiment. FIG. 8 is a diagram for describing a shot noise superimposition process according to the present embodiment.

As shown in FIG. 7, in step S11, the user selects a combination of an antibody to be stained and a dye. In step S12, the simulated image generation unit 131*a* determines the spectral intensity of a dye to be imparted from the autofluorescence intensity of the non-stained image to be superimposed. In step S13, the simulated image generation unit 131*a* creates a fluorescence image (a dye tile image) by repeatedly arranging dye tiles while imparting noise (imaging noise) in consideration of a noise level at the time of image capturing and measurement for each pixel. The simulated image generation unit 131*a* superimposes the created fluorescence image on the non-stained image. Thus, the simulated image is completed.

Specifically, in step S12 above, the spectral intensity of the dye to be imparted to the autofluorescence intensity of the non-stained image (the background image) is determined. For example, the luminance of the dye spectrum to be imparted to the autofluorescence intensity of the non-stained image is determined by the following flows (a) to (c).

(a) Calculation of Peak Position Intensity of Dye

The simulated image generation unit 131*a* acquires the intensity corresponding to a peak position of 16 nm (corresponding to 2 channels from the maximum value) of each dye spectrum and integrates values.

(b) Peak Position Intensity of Autofluorescence

The simulated image generation unit 131*a* acquires the autofluorescence intensity of the background image. For example, the simulated image generation unit 131*a* integrates the spectral intensity of the background image corresponding to two channels of a peak position of each dye. At this time, the spectral intensity of the wavelength channel of the background image is an average value of all the pixels.

(c) Determination of Dye Intensity to be Imparted to Autofluorescence Intensity

The simulated image generation unit 131*a* determines the dye intensity to be imparted to the autofluorescence intensity of the background image from an antigen expression rate, an antibody labeling rate, dye excitation efficiency, dye luminous efficiency, and the like. The simulated image generation unit 131*a* obtains and adjusts the magnification of the dye spectrum from the spectral intensity obtained in the above (a) and (b) so as to obtain the set dye intensity. Note that the magnification is obtained from the following Expression (1). Expression (1) is an expression relating to a method of obtaining dye intensity with respect to autofluorescence.

$$\frac{\text{Peak position spectral intensity of dye} \times \text{Magnification}}{\text{Autoflourescence spectral intensity of background image of corresponding position}} = \text{Set dye intensity} \qquad \text{Expression (1)}$$

Further, in step S13 above, noise superimposition corresponding to the imaging parameter is performed. For example, noise characteristics of a CMOS as a recording device include dark current and readout noise that increase in proportion to exposure time, and shot noise that is proportional to a square root of signal intensity. In this evaluation system, since the dark current noise and the readout noise component are already included in the actually measured non-stained image, only the shot noise component may be imparted to the dye spectrum to be superimposed. The shot noise superimposition is performed in the following flows (a) to (d).

(a) The simulated image generation unit 131*a* divides the dye spectrum by the wavelength calibration data (conversion coefficient from the camera output value to the spectral radiance) and returns it to the AD value.

(b) The simulated image generation unit 131*a* converts the AD value into a charge amount e− from the gain and the pixel saturation charge amount at the time of capturing the background image.

$$\text{Gain Gain} = 10\text{^}\left(\frac{\text{dB}}{\text{value}}/20\right) \qquad \text{Expression (2)}$$

$$\text{Conversion coefficient } H = \text{Saturation charge amount} \times \frac{\text{Binning}/\text{Gain}}{AD \text{ conversion pixel maximum value}}$$

$$\text{Charge } E(\lambda) = \frac{F(\lambda)}{Cor(\lambda)} \times H$$

Expression (2) is a charge amount conversion equation. F(λ): standard spectrum of dye, Cor (λ): wavelength calibration data, H: conversion coefficient, and E(λ): charge amount.

(c) The simulated image generation unit 131*a* superimposes random noise of $\sigma=S^{1/2}$ (S: charge amount $e^-$ per pixel) as shot noise.

$$newE\,(\lambda) \quad = E(\lambda) + \sqrt{E(\lambda)} \times Nrand \qquad \text{Expression (3)}$$
$$= E(\lambda) + \sqrt{S}$$

Expression (3) is a shot noise superposition equation. newE($\lambda$): standard spectrum of dye on which shot noise is superimposed, Nrand: normal random number with $\sigma=1$, and S: charge amount per pixel e–.

(d) After superimposing the shot noise in the above (c), the simulated image generation unit 131a returns the dye spectrum to the spectral radiance in the reverse flow of (a) to (b).

Figure 8:
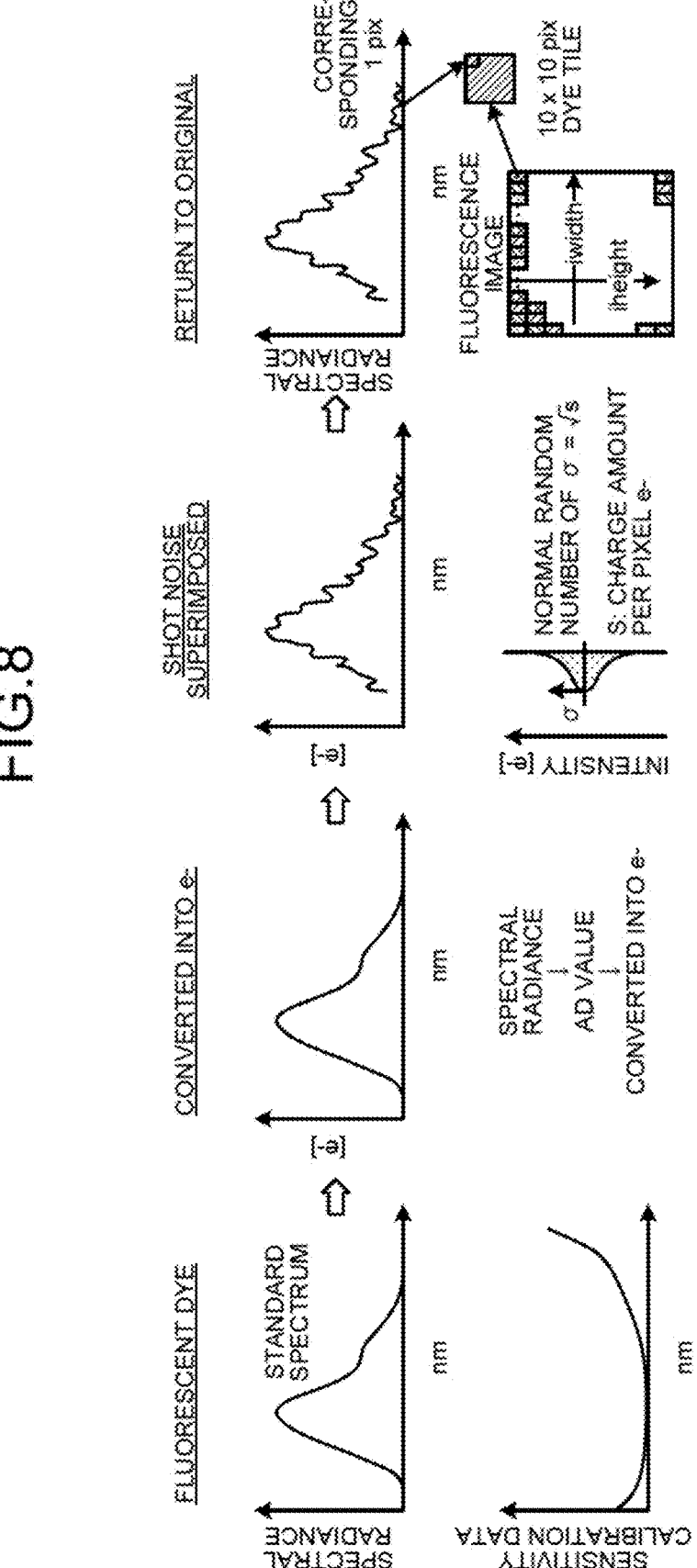
FIG. 8 is a diagram for describing a shot noise superimposition process according to the first embodiment.

FIG. 8 shows the flows of (a) to (d) described above. Since the dye spectrum created by the above flows (a) to (d) corresponds to one pixel of the image, the dye spectra are repeatedly arranged as dye tiles of 10×10 pixels, and a fluorescence image (dye tile image) is created.

<1-6. Processing Example of Quantitative Evaluation>

Figure 9:
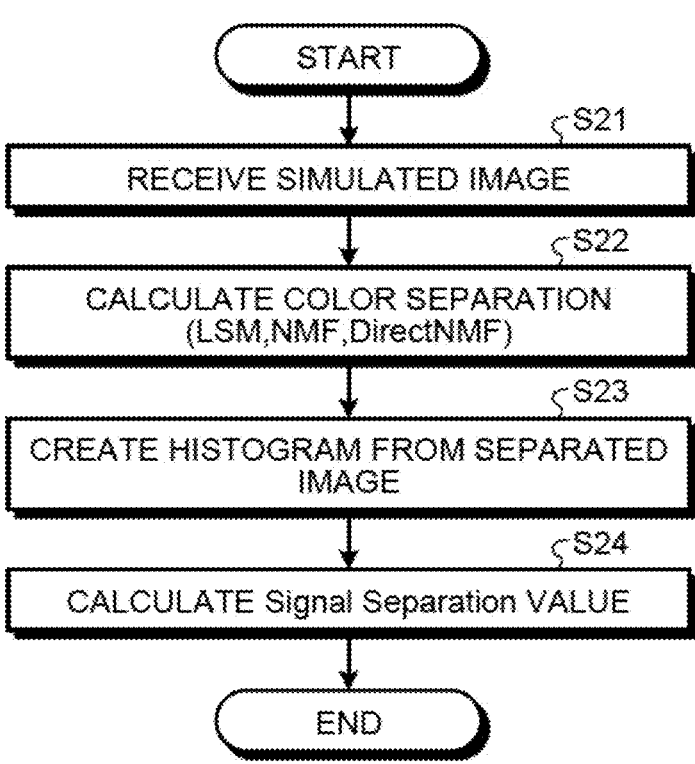
FIG. 9 is a flowchart showing an example of a flow of a quantitative evaluation process according to the first embodiment.
Figure 10:
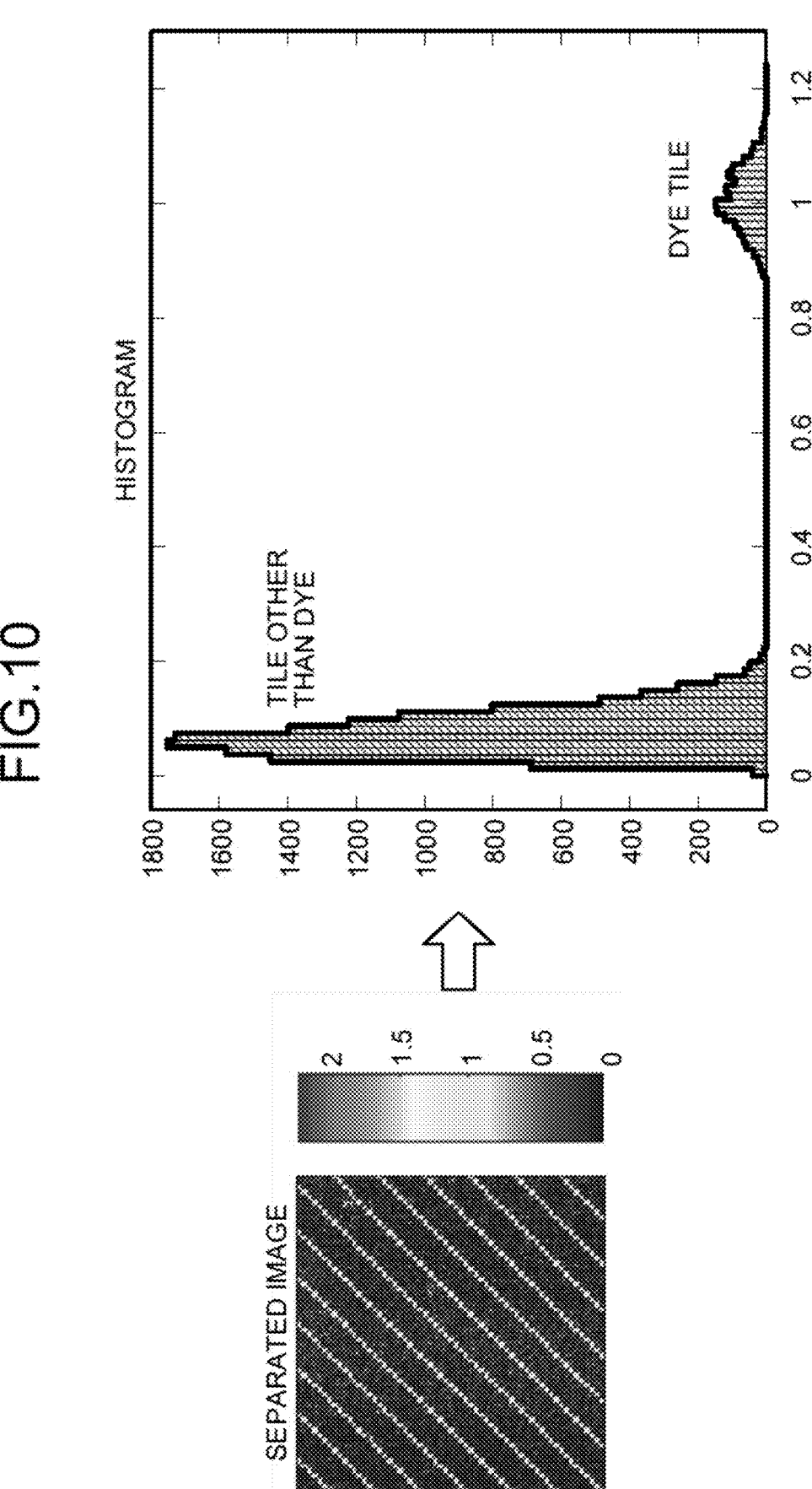
FIG. 10 is a diagram showing an example of a separated image and a histogram according to the first embodiment.
Figure 11:
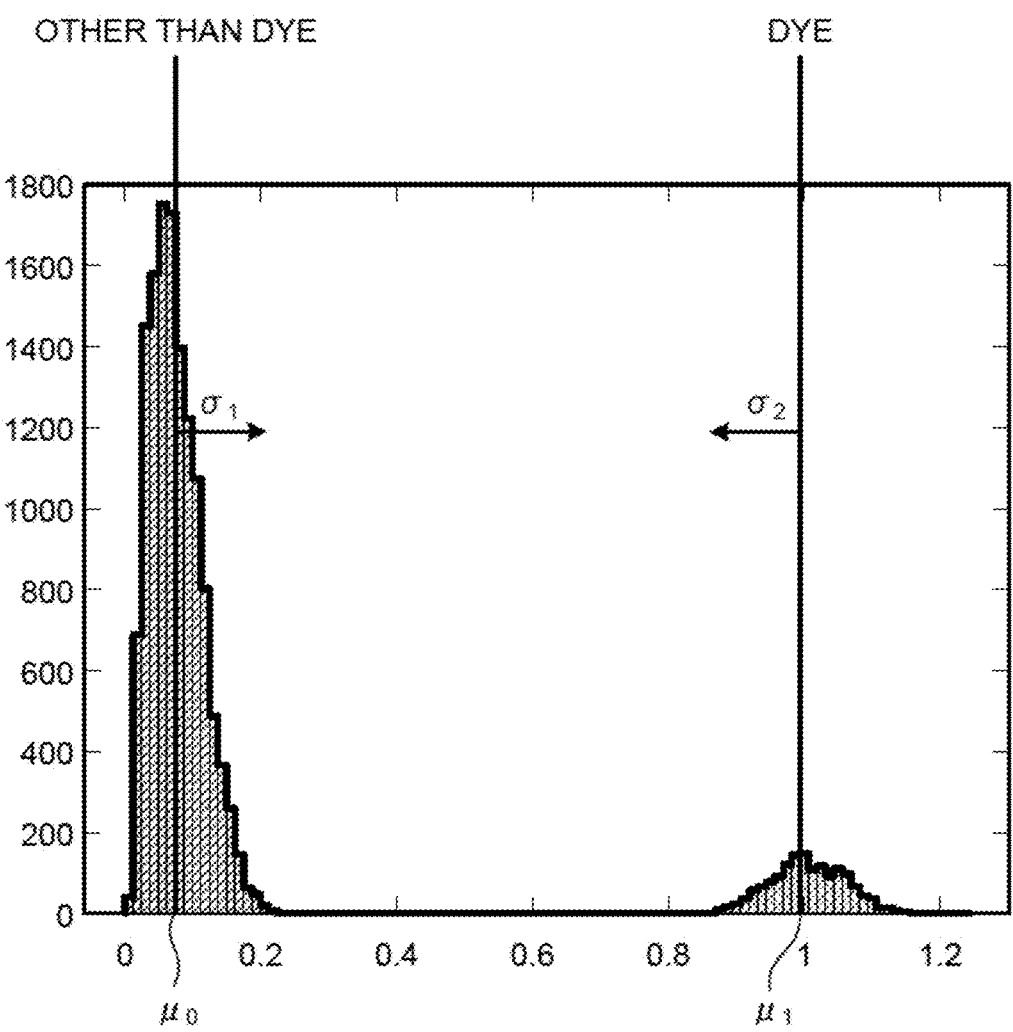
FIG. 11 is a diagram for describing calculation of a signal separation value based on a histogram according to the first embodiment.

A processing example of the quantitative evaluation according to the present embodiment will be described with reference to FIGS. 9 to 11. FIG. 9 is a flowchart showing an example of a flow of a quantitative evaluation process according to the present embodiment. FIG. 10 is a diagram showing an example of a separated image and a histogram according to the present embodiment. FIG. 11 is a diagram for describing calculation of a signal separation value based on the histogram according to the present embodiment.

As shown in FIG. 9, in step S21, the fluorescence separation unit 131b receives the simulated image. In step S22, the fluorescence separation unit 131b executes the color separation calculation on the simulated image. In step S23, the evaluation unit 131c creates a histogram from the separated image. In step S24, the evaluation unit 131c calculates a signal separation value.

Specifically, in step S22 above, the fluorescence separation unit 131b performs color separation using a color separation algorithm (for example, LSM, NMF, or the like) to be evaluated using the set of dye spectra used and the set of autofluorescence spectra as input values.

In step S23 above, after the color separation calculation, the evaluation unit 131c generates a histogram from the separated image for each dye as shown in FIG. 10.

Furthermore, in step S24 above, the evaluation unit 131c regards 10×10 pixels corresponding to one cell and the average value luminance of one tile as one signal, and calculates the signal separation value from the average value $\mu$ and the standard deviation $\sigma$ of the luminance of all tiles as shown in FIG. 11. For example, when the signal separation value exceeds the detection limit value of $3.29\sigma=1.645$, the color separation performance (for example, the color separation accuracy) is sufficient.

$$\text{Signal separation value} = \frac{\mu_1 - \mu_0}{\sigma_1 + \sigma_2} \qquad \text{Expression (4)}$$

Expression (4) is a calculation expression of a signal separation value. $\mu\_0$: average value of tiles other than the dye to be evaluated, $\mu\_1$: average value of tiles of the dye to be evaluated, $\sigma\_1$: standard deviation of tiles of the dye to be evaluated, and $\sigma\_2$: standard deviation of tiles other than the dye to be evaluated (see FIG. 11).

<1-7. Image Example of Separated Image>

Figure 12:
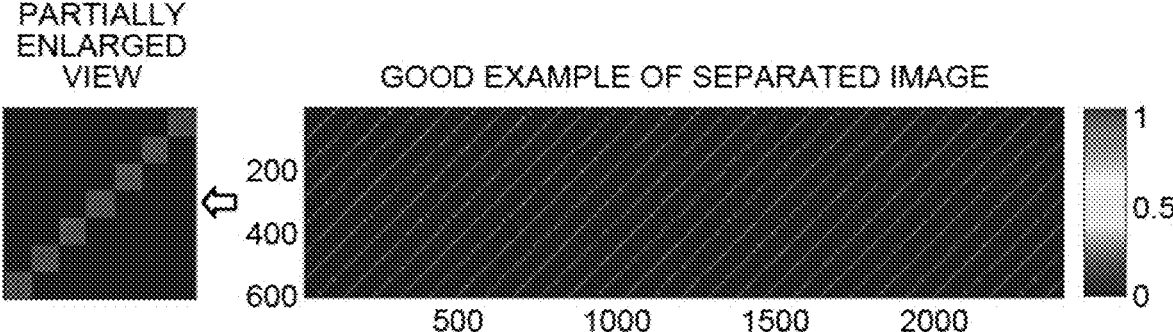
FIG. 12 is a diagram showing an example of a separated image according to the first embodiment.
Figure 13:
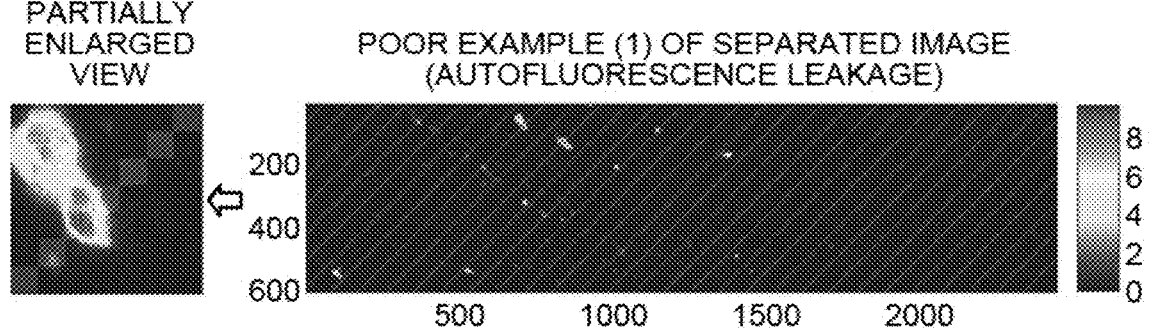
FIG. 13 is a diagram showing an example of a separated image according to the first embodiment.
Figure 14:
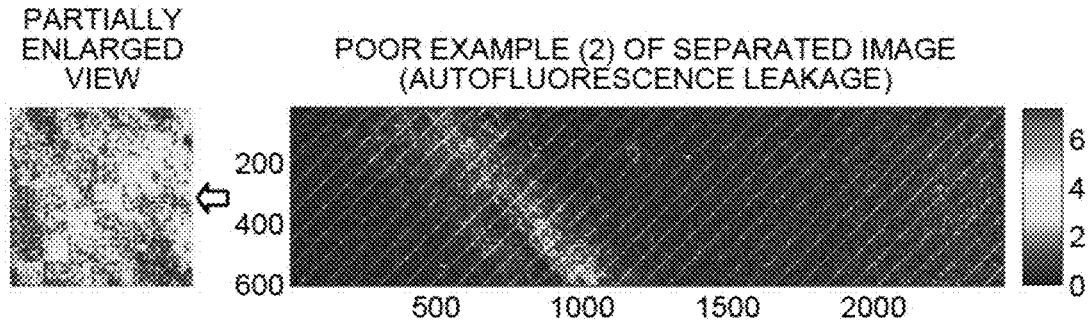
FIG. 14 is a diagram showing an example of a separated image according to the first embodiment.

An image example of the separated image according to the present embodiment will be described with reference to FIGS. 12 to 14. FIGS. 12 to 14 are diagrams each showing an example of a separated image according to the present embodiment.

FIG. 12 is a good example of the separated image, FIG. 13 is a poor example 1 of the separated image (leakage of autofluorescence), and FIG. 14 is a poor example 2 of the separated image (leakage of autofluorescence). These images are displayed by the display unit 140 as necessary. The presence or absence of the display may be selectable by a user's input operation on the operating unit 160.

As shown in FIG. 12, there is no autofluorescence leakage in the separated image. In the example of FIG. 12, a partially enlarged view is shown, but there is no autofluorescence leakage even in this partially enlarged view. On the other hand, as shown in FIG. 13, there is autofluorescence leakage in the separated image. In the example of FIG. 13, a partially enlarged view of a portion having autofluorescence leakage is shown, but there is strong autofluorescence leakage. Similarly to FIG. 13, as shown in FIG. 14, autofluorescence leakage occurs in the separated image. In the example of FIG. 14, similarly to FIG. 13, a partially enlarged view of a portion where autofluorescence leakage occurs is shown, but there is strong autofluorescence leakage.

<1-8. Image Example of Evaluation Result Image>

Figure 15:
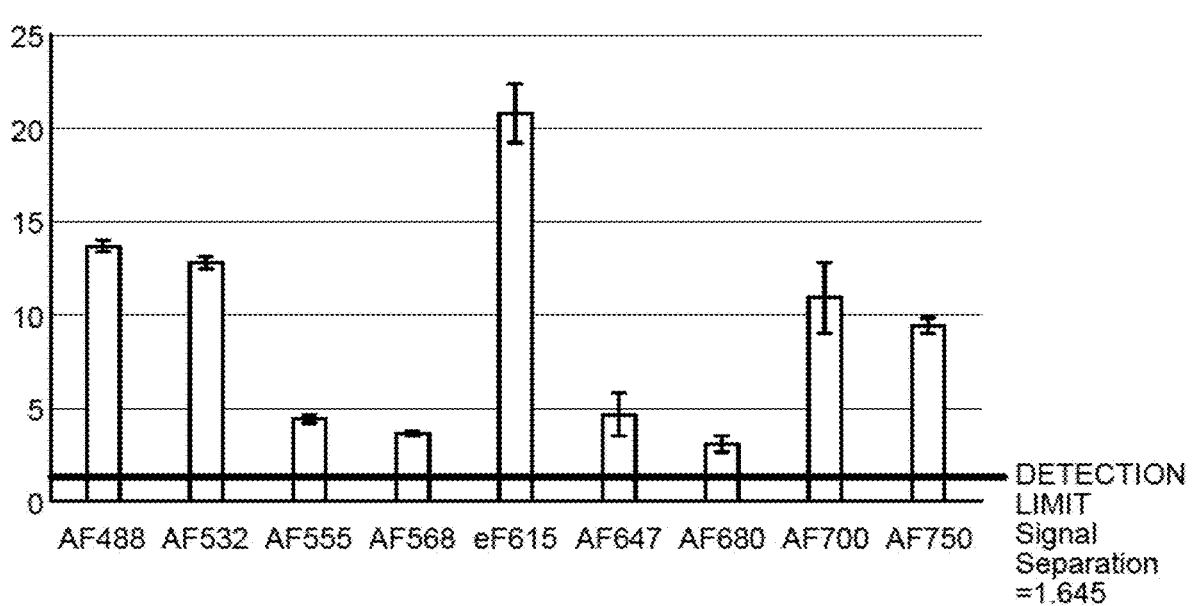
FIG. 15 is a bar graph showing a signal separation value for each dye according to the first embodiment.
Figure 16:
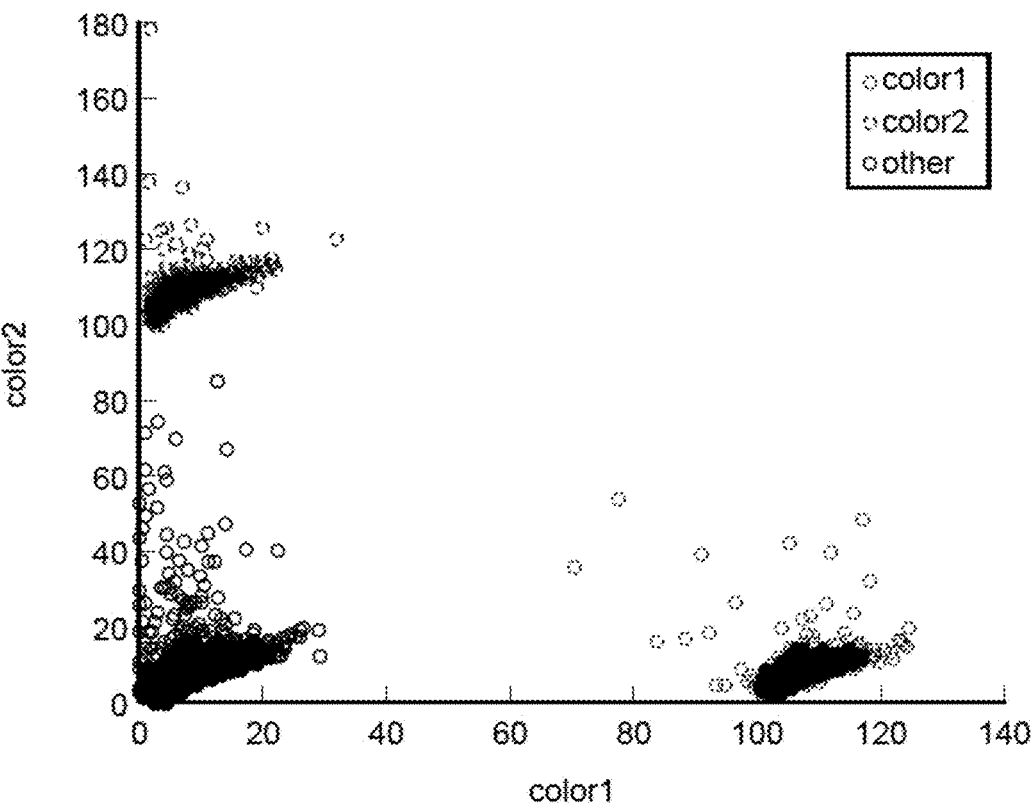
FIG. 16 is a scatter diagram showing a signal separation value for each dye according to the first embodiment.

An image example of an evaluation result image according to the present embodiment will be described with reference to FIGS. 15 and 16. FIG. 15 is a bar graph showing a signal separation value for each dye according to the present embodiment. FIG. 16 is a scatter diagram showing a signal separation value for each dye according to the present embodiment.

As shown in FIG. 15, a bar graph indicating the signal separation value for each dye is displayed on the display unit 140. In addition, as shown in FIG. 16, a scatter diagram indicating the signal separation value for each dye is displayed on the display unit 140. This scatter diagram is a scatter diagram showing leakage between dyes with close excitation. These bar flags and dispersion diagrams are generated by the evaluation unit 131c and output to the display unit 140. The bar graph and the dispersion diagram are images indicating the evaluation results of the evaluation unit 131c, and are merely examples. The presence or absence of the display and the display mode (for example, a display mode such as a bar graph or a distributed diagram) may be selectable by a user's input operation on the operating unit 160.

As described above, with the information processing system according to the present embodiment, while devising to superimpose noise characteristics corresponding to imaging parameters such as gain and exposure time on the dye spectrum for each pixel, dye tiles having the number of pixels corresponding to the size of the cell are repeatedly arranged for the number of dyes to be stained, and superimposed on the non-stained image, thereby creating a stained image (simulated image) simulating actual measurement. This makes it possible to reflect the spectral shape of the measured autofluorescence and the characteristics of the noise level, so that a simulated image can be created under any image-capturing conditions.

Further, by creating a simulated image in which dye tiles are repeatedly arranged, a pixel on which a dye is superimposed and other pixels including autofluorescence can be distinguished, so that the accuracy of color separation can be quantitatively calculated as a signal separation value from the average and standard deviation of each pixel. In addition, since the dye intensity to be imparted to the autofluorescence spectrum of the non-stained image can be set from the antigen expression rate, the antibody labeling rate, the dye excitation efficiency, the dye luminous efficiency, and the like, the color separation accuracy can be evaluated even under any staining conditions.

That is, the simulated image generation unit 131a generates a dye tile image by superimposing, in a tile shape, a dye spectrum to which a noise characteristic corresponding to the imaging parameter is imparted on a non-stained image acquired by image-capturing, combines the dye tile image and the non-stained image, and creates an image (simulated image) simulating actual measurement. Thus, staining conditions or the like in which the dye luminance level is not high with respect to autofluorescence can also be reproduced, and a dye and a pixel having autofluorescence can be distinguished. Consequently, the accuracy of color separation can be quantitatively obtained as a signal separation value from the average and variance of pixels.

For example, the accuracy of the color separation algorithm can be quantitatively obtained as a numerical value called a signal separation value obtained from the variance and the average. Further, evaluation of a combination of dyes or a combination of a dye and a reagent can also be quantitatively obtained as a numerical value. In addition, quantitative evaluation can be performed even in tissue sites having different autofluorescence spectra (different tissues), and composite evaluation can also be performed.

Usually, the accuracy of the color separation algorithm is a qualitative evaluation by visual observation, but according to the present embodiment, quantitative evaluation can be performed to select an optimal color separation algorithm. In addition, although there is a problem described in 1 to 4 above, the accuracy of color separation can be quantitatively evaluated even under any staining conditions. Further, since composite evaluation is possible, a more optimal panel design can be made. Furthermore, the evaluation can be performed even in a case where overlapping of dyes or an influence of autofluorescence is large. In addition, although the characteristics of autofluorescence vary depending on the tissue site, spatial composite evaluation can also be performed. The panel design can be simulated in consideration of the noise level of the measurement system.

For example, if the non-stained image to be superimposed is only DAPI (4',6-Diamidino-2-phenylindole, dihydrochloride) staining, simulation with the dye selected by the user+DAPI becomes possible. Further, evaluation of the color separation algorithm and panel design can be performed in consideration of leakage of DAPI and the like.

<1-9. Application Example>

Figure 17:
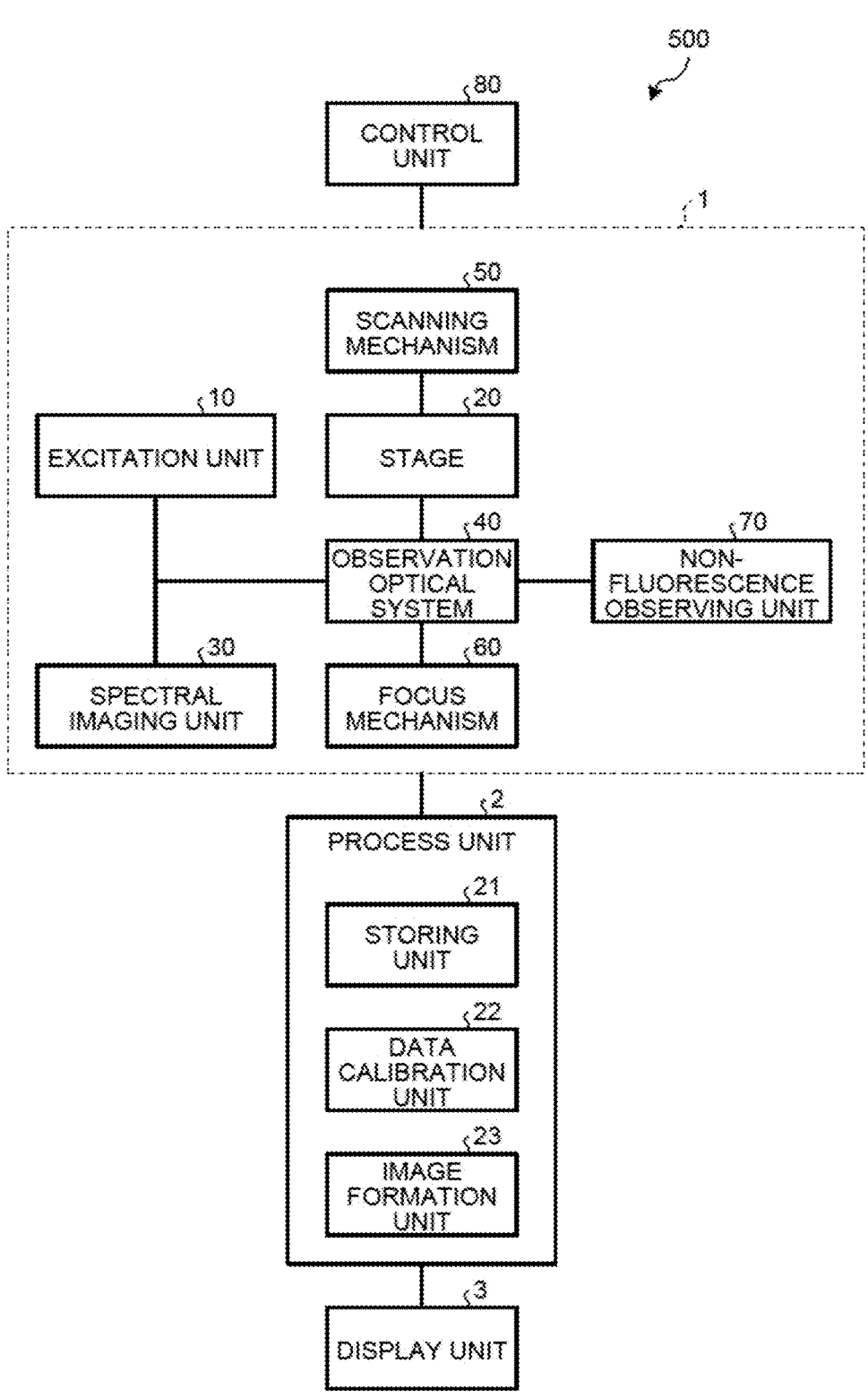
FIG. 17 is a diagram showing an example of a schematic configuration of a fluorescence observation apparatus according to the first embodiment.
Figure 18:
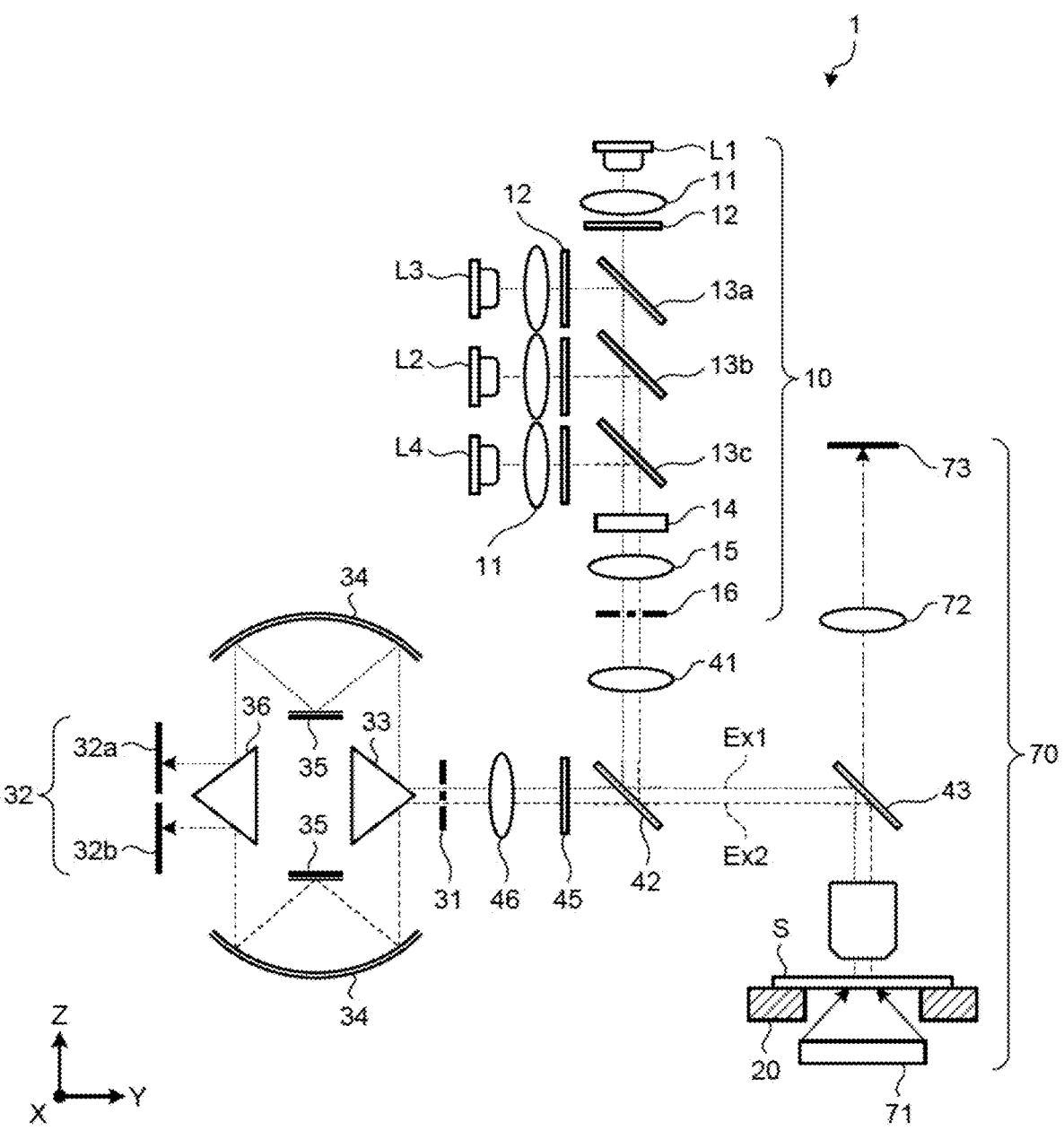
FIG. 18 is a diagram showing an example of a schematic configuration of an observation unit according to the first embodiment.

The technology according to the present disclosure can be applied to, for example, a fluorescence observation apparatus 500 (an example of a microscope system) or the like. Hereinafter, a configuration example of an applicable fluorescence observation apparatus 500 will be described with reference to FIGS. 17 and 18. FIG. 17 is a diagram showing an example of a schematic configuration of the fluorescence observation apparatus 500 according to the present embodiment. FIG. 18 is a diagram showing an example of a schematic configuration of an observation unit 1 according to the present embodiment.

As shown in FIG. 17, the fluorescence observation apparatus 500 includes the observation unit 1, a process unit 2, and a display unit 3.

The observation unit 1 includes an excitation unit (irradiation unit) 10, a stage 20, a spectral imaging unit 30, an observation optical system 40, a scanning mechanism 50, a focus mechanism 60, and a non-fluorescence observing unit 70.

The excitation unit 10 irradiates the observation target with a plurality of beams of irradiation light having different wavelengths. For example, the excitation unit 10 irradiates a pathological specimen (pathological sample), which is the observation target, with a plurality of line illuminations having different wavelengths arranged in parallel with different axes. The stage 20 is a table that supports the pathological specimen, and is configured to be movable in a direction perpendicular to the direction of line light by the line illuminations by the scanning mechanism 50. The spectral imaging unit 30 includes a spectroscope and acquires a fluorescence spectrum (spectroscopic data) of the pathological specimen excited linearly by the line illuminations.

That is, the observation unit 1 functions as a line spectroscope that acquires spectroscopic data corresponding to the line illuminations. Further, the observation unit 1 also functions as an imaging device that captures a plurality of fluorescence images generated by an imaging target (pathological specimen) for each of a plurality of fluorescence wavelengths for each line and acquires data of the plurality of captured fluorescence images in an arrangement order of the lines.

Here, parallel with different axis means that the plurality of line illuminations has different axes and are parallel. The different axes mean that the axes are not coaxial, and the distance between the axes is not particularly limited. The parallel is not limited to parallel in a strict sense, and includes a state of being substantially parallel. For example, there may be distortion originated from an optical system such as a lens or deviation from a parallel state due to manufacturing tolerance, and this case is also regarded as parallel.

The excitation unit 10 and the spectral imaging unit 30 are connected to the stage 20 via the observation optical system 40. The observation optical system 40 has a function of following an optimum focus by the focus mechanism 60. The non-fluorescence observing unit 70 for performing dark field observation, bright field observation, and the like may be connected to the observation optical system 40. In addition, a control unit 80 that controls the excitation unit 10, the spectral imaging unit 30, the scanning mechanism 50, the focus mechanism 60, the non-fluorescence observing unit 70, and the like may be connected to the observation unit 1.

The process unit 2 includes a storing unit 21, a data calibration unit 22, and an image formation unit 23. The process unit 2 typically forms an image of the pathological specimen or outputs a distribution of the fluorescence spectrum on the basis of the fluorescence spectrum of the pathological specimen (hereinafter also referred to as a sample S) acquired by the observation unit 1. The image referred to herein refers to a constituent ratio of autofluorescence derived from a dye or a sample, or the like constituting the spectrum, an image converted from waveforms into RGB (red, green, and blue) color, a luminance distribution in a specific wavelength band, and the like.

The storing unit 21 includes a nonvolatile storage medium such as a hard disk drive or a flash memory, and a storage control unit that controls writing and reading of data to and from the storage medium. The storing unit 21 stores spectroscopic data indicating a correlation between each wavelength of light emitted by each of the plurality of line illuminations included in the excitation unit 10 and fluorescence received by the camera of the spectral imaging unit 30. Further, the storing unit 21 stores in advance information indicating a standard spectrum of autofluorescence related to a sample (pathological specimen) to be observed and information indicating a standard spectrum of a single dye staining the sample.

The data calibration unit 22 configures the spectroscopic data stored in the storing unit 21 on the basis of the captured image captured by the camera of the spectral imaging unit 30. The image formation unit 23 forms a fluorescence image of the sample on the basis of the spectroscopic data and an interval Δy of the plurality of line illuminations irradiated by the excitation unit 10. For example, the process unit 2 including the data calibration unit 22, the image formation unit 23, and the like is implemented by hardware elements used in a computer such as a central processing unit (CPU), a random access memory (RAM), and a read only memory (ROM), and a necessary program (software). Instead of or in addition to the CPU, a programmable logic device (PLD) such as a field programmable gate array (FPGA), a digital signal processor (DSP), an application specific integrated circuit (ASIC), or the like may be used.

The display unit 3 displays, for example, various types of information such as an image based on the fluorescence image formed by the image formation unit 23. The display unit 3 may include, for example, a monitor integrally attached to the process unit 2, or may be a display device connected to the process unit 2. The display unit 3 includes, for example, a display element such as a liquid crystal device or an organic EL device, and a touch sensor, and is configured as a user interface (UI) that displays input settings of image-capturing conditions, a captured image, and the like.

Next, details of the observation unit 1 will be described with reference to FIG. 18. Here, a description will be given on the assumption that the excitation unit 10 includes two line illuminations Ex1 and Ex2 that each emit light of two wavelengths. For example, the line illumination Ex1 emits light having a wavelength of 405 nm and light having a wavelength of 561 nm, and the line illumination Ex2 emits light having a wavelength of 488 nm and light having a wavelength of 645 nm.

As shown in FIG. 18, the excitation unit 10 includes a plurality of excitation light sources L1, L2, L3, and L4 (four excitation light sources in this example). Each of the excitation light sources L1 to L4 includes a laser light source that outputs laser light having a wavelength of 405 nm, 488 nm, 561 nm, and 645 nm, respectively. For example, each of the excitation light sources L1 to L4 includes a light emitting diode (LED), a laser diode (LD), or the like.

Furthermore, the excitation unit 10 includes a plurality of collimator lenses 11, a plurality of laser line filters 12, a plurality of dichroic mirrors 13a, 13b, and 13c, a homogenizer 14, a condenser lens 15, and an incident slit 16 so as to correspond to each of the excitation light sources L1 to L4.

The laser light emitted from the excitation light source L1 and the laser light emitted from the excitation light source L3 are collimated by the collimator lens 11, transmitted through the laser line filter 12 for cutting a skirt of each wavelength band, and made coaxial by the dichroic mirror 13a. The two coaxial laser lights are further beam-shaped by the homogenizer 14 such as a fly-eye lens and the condenser lens 15 so as to be the line illumination Ex1.

Similarly, the laser light emitted from the pumping light source L2 and the laser light emitted from the excitation light source L4 are coaxial by the dichroic mirrors 13b and 13c, and line illumination is performed so that the line illumination Ex2 is different in axis from the line illumination Ex1. The line illuminations Ex1 and Ex2 form line illuminations with different axes (primary image), which are separated by a distance Δy in the incident slit 16 (slit conjugate) having a plurality of slit portions through which each of the line illuminations Ex1 and Ex2 can pass.

Note that, in the present embodiment, an example in which the four lasers have two coaxial axes and two different axes will be described, but in addition to this, the two lasers may have two different axes or the four lasers may have four different axes.

The sample S on the stage 20 is irradiated with the primary image via the observation optical system 40. The observation optical system 40 includes a condenser lens 41, dichroic mirrors 42 and 43, an objective lens 44, a band pass filter 45, and a condenser lens (an example of an imaging lens) 46. The line illuminations Ex1 and Ex2 are collimated by the condenser lens 41 paired with the objective lens 44, reflected by the dichroic mirrors 42 and 43, transmitted through the objective lens 44, and irradiates the sample S on the stage 20.

Figure 19:
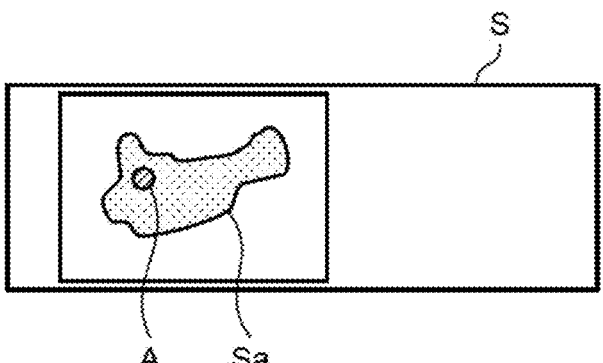
FIG. 19 is a diagram showing an example of a sample according to the first embodiment.

Here, FIG. 19 is a diagram showing an example of the sample S according to the present embodiment. FIG. 19 shows a state in which the sample S is viewed from the irradiation directions of the line illuminations Ex1 and Ex2 as excitation light. The sample S is typically configured by a slide including an observation target Sa such as a tissue section as shown in FIG. 19, but may be of course other than that. The observation target Sa is, for example, a biological sample such as a nucleic acid, a cell, a protein, a bacterium, or a virus. The sample S (observation target Sa) is stained with a plurality of fluorescent dyes. The observation unit 1 enlarges and observes the sample S at a desired magnification.

Figure 20:
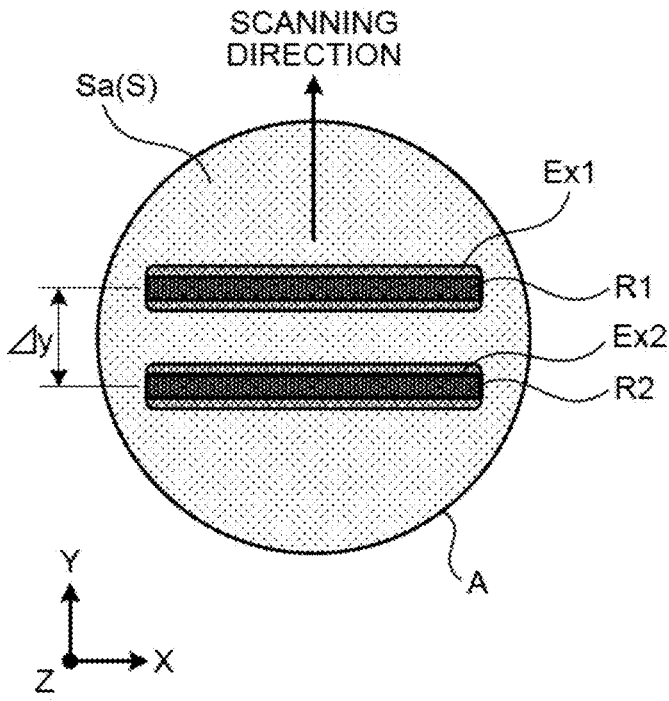
FIG. 20 is an enlarged diagram showing a region where the sample according to the first embodiment is irradiated with line illumination.

FIG. 20 is an enlarged diagram showing a region A in which the sample S according to the present embodiment is irradiated with the line illuminations Ex1 and Ex2. In the example of FIG. 20, two line illuminations Ex1 and Ex2 are arranged in the region A, and imaging areas R1 and R2 of the spectral imaging unit 30 are arranged so as to overlap the line illuminations Ex1 and Ex2. The two line illuminations Ex1 and Ex2 are each parallel to a Z-axis direction and are arranged apart from each other by a predetermined distance Δy in a Y-axis direction.

The line illuminations Ex1 and Ex2 are formed on the surface of the sample S as shown in FIG. 20. As shown in FIG. 18, fluorescence excited in the sample S by the line illuminations Ex1 and Ex2 is condensed by the objective lens 44, reflected by the dichroic mirror 43, transmitted through the dichroic mirror 42 and the band pass filter 45 that cuts off the excitation light, condensed again by the condenser lens 46, and incident on the spectral imaging unit 30.

As shown in FIG. 18, the spectral imaging unit 30 includes an observation slit (opening) 31, an imaging element 32, a first prism 33, a mirror 34, a diffraction grating 35 (wavelength dispersion element), and a second prism 36.

In the example of FIG. 18, the imaging element 32 includes two imaging elements 32a and 32b. The imaging element 32 captures (receives) a plurality of light beams (fluorescence and the like) wavelength-dispersed by the diffraction grating 35. As the imaging element 32, for example, a two-dimensional imager such as a charge coupled device (CCD) or a complementary metal oxide semiconductor (CMOS) is employed.

The observation slit 31 is disposed at the condensing point of the condenser lens 46, and has the same number of (two in this example) slit portions as the number of excitation lines. The fluorescence spectra derived from the two excitation lines that have passed through the observation slit 31 are separated by the first prism 33 and reflected by a grating surface of the diffraction grating 35 via the mirror 34, so that the fluorescence spectra are further separated into fluorescence spectra of respective excitation wavelengths. The four separated fluorescence spectra are incident on the imaging elements 32a and 32b via the mirror 34 and the second prism 36, and are developed as spectroscopic data into spectroscopic data (x, λ) expressed by the position x in the line direction and the wavelength λ. The spectroscopic data (x, λ) is a pixel value of a pixel at a position x in a row direction and at a position of a wavelength λ in a column direction among pixels included in the imaging element 32. Note that the spectroscopic data (x, λ) may be simply described as spectroscopic data.

Note that the pixel size [nm/Pixel] of the imaging elements 32a and 32b is not particularly limited, and is set, for example, equal to or more than 2 [nm/Pixel] and equal to or less than 20 [nm/Pixel]. This dispersion value may be achieved optically or at a pitch of the diffraction grating 35, or may be achieved by using hardware binning of the imaging elements 32a and 32b. In addition, the dichroic mirror 42 and the band pass filter 45 are inserted in the middle of the optical path so that the excitation light (line illuminations Ex1 and Ex2) does not reach the imaging element 32.

Each of the line illuminations Ex1 and Ex2 is not limited to the case of being configured with a single wavelength, and each may be configured with a plurality of wavelengths. When the line illuminations Ex1 and Ex2 are each formed by a plurality of wavelengths, the fluorescence excited by these also includes a plurality of spectra. In this case, the spectral imaging unit 30 includes a wavelength dispersion element for separating the fluorescence into a spectrum derived from the excitation wavelength. The wavelength dispersion element includes a diffraction grating, a prism, or the like, and is typically disposed on an optical path between the observation slit 31 and the imaging element 32.

Note that the stage 20 and the scanning mechanism 50 constitute an X-Y stage, and move the sample S in the X-axis direction and the Y-axis direction in order to acquire a fluorescence image of the sample S. In the whole slide imaging (WSI), an operation of scanning the sample S in the Y-axis direction, then moving the sample S in the X-axis direction, and further performing scanning in the Y-axis direction is repeated. By using the scanning mechanism 50, it is possible to continuously acquire dye spectra (fluorescence spectra) excited at different excitation wavelengths, which are spatially separated by the distance Δy on the sample S (observation target Sa) in the Y-axis direction.

The scanning mechanism 50 changes the position irradiated with the irradiation light in the sample S over time. For example, the scanning mechanism 50 scans the stage 20 in the Y-axis direction. The scanning mechanism 50 can cause the stage 20 to scan the plurality of line illuminations Ex1 and Ex2 in the Y-axis direction, that is, in the arrangement direction of the line illuminations Ex1 and Ex2. This is not limited to this example, and the plurality of line illuminations Ex1 and Ex2 may be scanned in the Y-axis direction by a galvano mirror disposed in the middle of the optical system. Since the data derived from each of the line illuminations Ex1 and Ex2 (for example, the two-dimensional data or the three-dimensional data) is data whose coordinates are shifted by the distance Δy with respect to the Y axis, the data is corrected and output on the basis of the distance Δy stored in advance or the value of the distance Δy calculated from the output of the imaging element 32.

As shown in FIG. 18, the non-fluorescence observing unit 70 includes a light source 71, the dichroic mirror 43, the objective lens 44, a condenser lens 72, an imaging element 73, and the like. In the non-fluorescence observing unit 70, an observation system by dark field illumination is shown in the example of FIG. 18.

The light source 71 is disposed on the side facing the objective lens 44 with respect to the stage 20, and irradiates the sample S on the stage 20 with illumination light from the side opposite to the line illuminations Ex1 and Ex2. In a case of the dark field illumination, the light source 71 illuminates from the outside of the NA (numerical aperture) of the objective lens 44, and light (dark field image) diffracted by the sample S is imaged by the imaging element 73 via the objective lens 44, the dichroic mirror 43, and the condenser lens 72. By using dark field illumination, even a apparently transparent sample such as a fluorescently-stained sample can be observed with contrast.

Note that this dark field image may be observed simultaneously with fluorescence and used for real-time focusing. In this case, as the illumination wavelength, a wavelength that does not affect fluorescence observation may be selected. The non-fluorescence observing unit 70 is not limited to the observation system that acquires a dark field image, and may be configured by an observation system that can acquire a non-fluorescence image such as a bright field image, a phase difference image, a phase image, and an in-line hologram image. For example, as a method for acquiring a non-fluorescence image, various observation methods such as a Schlieren method, a phase difference contrast method, a polarization observation method, and an epi-illumination method can be employed. The position of the illumination light source is not limited to below the stage 20, and may be above the stage 20 or around the objective lens 44. In addition, not only a method of performing focus control in real time, but also another method such as a prefocus map method of recording focus coordinates (Z coordinates) in advance may be employed.

Note that, in the above description, the line illumination as the excitation light includes two line illuminations Ex1 and Ex2 but is not limited thereto, and may be three, four, or five or more. In addition, each line illumination may include a plurality of excitation wavelengths selected so that the color separation performance is not degraded as much as possible. Further, even if there is one line illumination, if it is an excitation light source including a plurality of excitation wavelengths and each excitation wavelength is recorded in association with the data acquired by the imaging element 32, it is possible to obtain a polychromatic spectrum although it is not possible to obtain separability to be parallel to different axes.

The application example in which the technology according to the present disclosure is applied to the fluorescence observation apparatus 500 has been described above. Note that the above-described configuration described with reference to FIGS. 17 and 18 is merely an example, and the configuration of the fluorescence observation apparatus 500 according to the present embodiment is not limited to such an example. For example, the fluorescence observation apparatus 500 may not necessarily include all of the configurations shown in FIGS. 17 and 18, and may include a configuration not shown in FIGS. 17 and 18.

<1-10. Operation and Effect>

As described above, according to the first embodiment, there are provided the simulated image generation unit 131a that generates a simulated image by superimposing a non-stained image containing an autofluorescence component and a dye tile image in which a standard spectrum (reference spectrum) of a first fluorescent dye and imaging noise for each pixel of the non-stained image are associated, the fluorescence separation unit 131b that separates the component of the first fluorescent dye and the autofluorescence component on the basis of the simulated image and generates a separated image, and the evaluation unit 131c that evaluates a degree of separation of the separated image. Thus, a simulated image is generated, the color separation process is performed on the simulated image to generate a separated image, and the degree of separation of the separated image is evaluated. By using the simulated image in this manner, the color separation accuracy can be quantitatively evaluated, so that the degree of fluorescence separation can be appropriately evaluated.

Further, the dye tile image may include the standard spectrum of the second fluorescent dye in addition to the first fluorescent dye, and may be an image in which the standard spectrum of each of the first fluorescent dye and the second fluorescent dye and the imaging noise of each pixel of the non-stained image are associated. Thus, simulated images corresponding to a plurality of fluorescent dyes can be generated.

In addition, the imaging noise may be noise that changes according to the imaging condition of the non-stained image. Thus, it is possible to generate the simulated image corresponding to the imaging condition of the non-stained image.

In addition, the imaging condition of the non-stained image may include at least one or all of laser power, gain, or exposure time. Thus, it is possible to generate a simulated image corresponding to these pieces of information.

In addition, the dye tile image may be a dye tile group having a plurality of dye tiles. Thus, it is possible to generate a simulated image corresponding to each dye tile.

In addition, the individual sizes of the plurality of dye tiles may also be the same as the cell size. Thus, it is possible to generate a simulated image corresponding to each dye tile having the same size as the cell size.

In addition, the plurality of dye tiles may be arranged in a predetermined color arrangement pattern. Thus, it is possible to perform the color separation process on the simulated image corresponding to each dye tile on the basis of the predetermined color arrangement pattern, so that the color separation process can be efficiently executed.

In addition, the degree of imaging noise may be quantified or visualized for each dye tile. Thus, when the degree of imaging noise is quantified, a simulated image corresponding to the quantified degree of imaging noise can be generated. Further, when the degree of imaging noise is visualized, the user can grasp the degree of imaging noise.

In addition, the simulated image generation unit 131a may repeatedly arrange the dye tiles corresponding to the number of dyes designated by the user to generate the dye tile image. Thus, it is possible to generate the simulated image corresponding to the dye tile corresponding to the number of dyes designated by the user.

In addition, the simulated image generation unit 131a may create a dye tile by mixing a plurality of dyes. Thus, the color separation performance (for example, color separation accuracy) under double staining conditions, triple staining conditions, or the like can be evaluated.

In addition, the simulated image generation unit 131a may determine the spectral intensity of the dye to be imparted to the autofluorescence intensity of the non-stained image. Thus, the staining condition under which the dye luminance level is not large with respect to the autofluorescence intensity can be reproduced, and the dye and the pixel having autofluorescence can be distinguished from each other.

In addition, the simulated image generation unit 131a may superimpose imaging noise on the standard spectrum of the first fluorescent dye. Thus, the dye tile image can be generated by associating the standard spectrum and the imaging noise.

In addition, the imaging noise to be superimposed may be shot noise. Thus, a dye tile image corresponding to shot noise can be generated.

In addition, the fluorescence separation unit 131b may separate the component of the first fluorescent dye and the autofluorescence component by the color separation calculation including at least one of the least squares method, the weighted least squares method, or the non-negative matrix factorization. Thus, the color separation process can be performed with high accuracy.

In addition, the evaluation unit 131c may generate a histogram from the separated image, calculate a signal separation value between the dye and a signal other than the dye from the histogram, and evaluate the degree of separation on the basis of the signal separation value. Thus, the degree of separation can be accurately evaluated. For example, in a case where the signal separation value exceeds a predetermined value (for example, 1.645), it is evaluated that the degree of separation is good.

2. Second Embodiment

<2-1. Configuration Example of Analysis Unit Related to Quantitative Evaluation>

Figure 21:
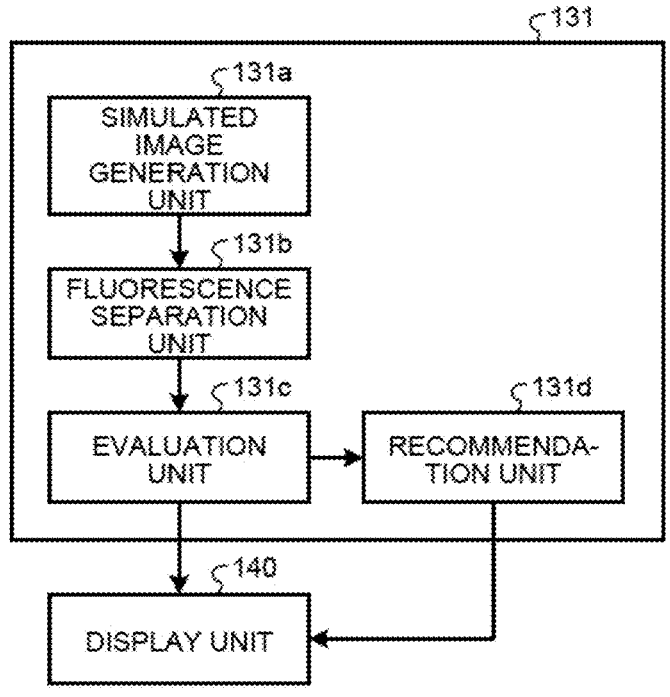
FIG. 21 is a diagram showing an example of a schematic configuration of an analysis unit according to a second embodiment.

A configuration example of the analysis unit 131 related to the quantitative evaluation according to the present embodiment will be described with reference to FIG. 21. FIG. 21 is a diagram showing an example of a schematic configuration of the analysis unit 131 according to the present embodiment.

As shown in FIG. 21, the analysis unit 131 includes a recommendation unit 131d in addition to the simulated image generation unit 131a, the fluorescence separation unit 131b, and the evaluation unit 131c according to the first embodiment.

The recommendation unit 131d recommends an optimal reagent (fluorescent reagent 10A) from dyes designated by the user from the degree of separation evaluated by the evaluation unit 131c. For example, the recommendation unit 131d generates an image (for example, a table, a diagram, or the like) for presenting spatial information evaluation by tissues having different autofluorescence spectra or an optimum combination of dyes for the tissues to the user, and the display unit 140 displays the image generated by the recommendation unit 131d. Thus, the user can visually recognize the display image and grasp the optimum combination of dyes.

For example, the evaluation unit 131c calculates a signal separation value for a combination of dyes used for staining or a combination of a dye and a reagent. The recommendation unit 131d generates an image for presenting to the user which combination is optimal on the basis of the calculation result (for example, the signal separation value for each combination). For example, the recommendation unit 131d excludes a dye whose signal separation value does not exceed 1.645, and generates an image indicating an optimum combination. Note that, in addition to generating an optimum combination, for example, an image (for example, a table, a diagram, or the like) indicating a plurality of recommended combinations together with color separation performance (for example, the signal separation value) may be generated. Further, an image (for example, a table or the like) representing matrix information indicating a combination of an antibody and a dye may be displayed for reference.

<2-2. Operation and Effect>

As described above, according to the second embodiment, effects similar to those of the first embodiment can be obtained. Further, the recommendation unit 131d that recommends an optimal reagent (fluorescent reagent 10A) corresponding to the dye designated by the user on the basis of the degree of separation is provided. Thus, since the user can grasp the optimal reagent, the convenience of the user can be improved.

In addition, the recommendation unit 131d may generate an image (for example, a table, a diagram, or the like) indicating a combination of dyes or a combination of a dye and a reagent. Thus, the user can grasp the combination of the dyes or the combination of the dye and the reagent, so that the convenience of the user can be improved.

In addition, the recommendation unit 131d may generate an image (for example, drawings and the like) indicating a combination of an antibody and a dye. Thus, the user can grasp the combination of the antibody and the dye, so that the convenience of the user can be improved.

3. Other Embodiments

The processing according to the above-described embodiment (or modification) may be performed in various different modes (modifications) other than the above-described embodiment. For example, among the processes described in the above embodiments, all or part of the processes described as being performed automatically can be performed manually, or all or part of the processes described as being performed manually can be performed automatically by a publicly known method. Further, the processing procedure, specific name, and information including various data and parameters depicted in the document and the drawings can be arbitrarily changed unless otherwise specified. For example, the various types of information depicted in each figure are not limited to the depicted information.

Further, each component of each device depicted in the drawings is functionally conceptual, and is not necessarily physically configured as depicted in the drawings. That is, a specific form of distribution and integration of each device is not limited to the depicted form, and all or a part thereof can be functionally or physically distributed and integrated in any unit according to various loads, usage conditions, and the like.

In addition, the above-described embodiments (or modifications) can be appropriately combined within a range that does not contradict processing contents. Further, the effects described in the present description are merely examples and are not limited, and other effects may be provided.

<4. Application Example>

The technology according to the present disclosure can be applied to, for example, a microscope system and the like. Hereinafter, a configuration example of a microscope system 5000 that can be applied will be described with reference to FIGS. 22 to 24. A microscope device 5100 which is a part of the microscope system 5000 functions as an imaging device.

Figure 22:
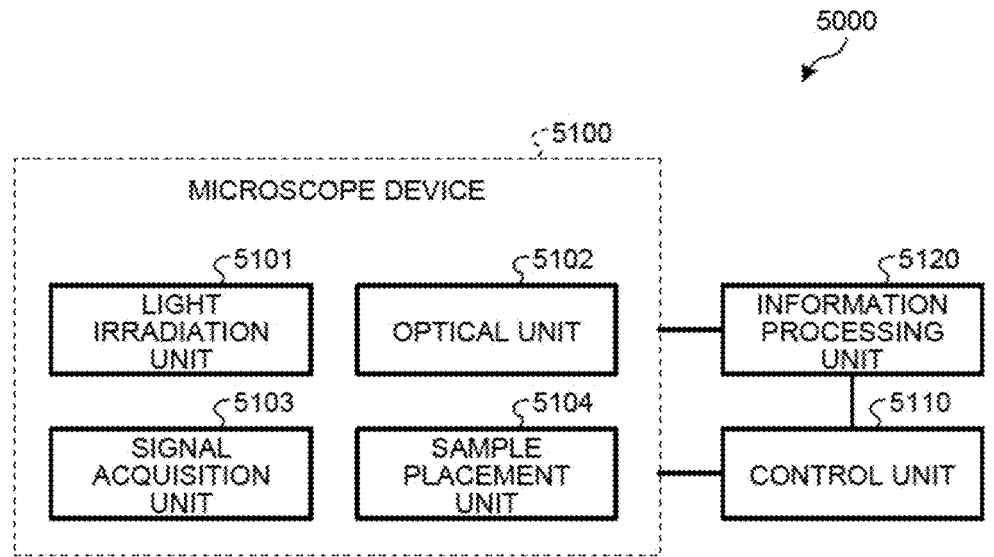
FIG. 22 is a diagram schematically showing the overall configuration of a microscope system.

FIG. 22 shows an example configuration of a microscope system of the present disclosure. A microscope system 5000 shown in FIG. 22 includes a microscope device 5100, a control unit 5110, and an information processing unit 5120.

The microscope device 5100 includes a light irradiation unit 5101, an optical unit 5102, and a signal acquisition unit 5103. The microscope device 5100 may further include a sample placement unit 5104 on which a biological sample S is placed. Note that the configuration of the microscope device is not limited to that shown in FIG. 22. For example, the light irradiation unit 5101 may exist outside the microscope device 5100, and a light source not included in the microscope device 5100 may be used as the light irradiation unit 5101. Alternatively, the light irradiation unit 5101 may be disposed so that the sample placement unit 5104 is sandwiched between the light irradiation unit 5101 and the optical unit 5102, and may be disposed on the side at which the optical unit 5102 exists, for example. The microscope device 5100 may be designed to be capable of performing one or more of the following: bright-field observation, phase contrast observation, differential interference contrast observation, polarization observation, fluorescent observation, and darkfield observation.

The microscope system 5000 may be designed as a so-called whole slide imaging (WSI) system or a digital pathology imaging system, and can be used for pathological diagnosis. Alternatively, the microscope system 5000 may be designed as a fluorescence imaging system, or particularly, as a multiple fluorescence imaging system.

For example, the microscope system 5000 may be used to make an intraoperative pathological diagnosis or a telepathological diagnosis. In the intraoperative pathological diagnosis, the microscope device 5100 can acquire the data of the biological sample S acquired from the subject of the operation while the operation is being performed, and then transmit the data to the information processing unit 5120. In the telepathological diagnosis, the microscope device 5100 can transmit the acquired data of the biological sample S to the information processing unit 5120 located in a place away from the microscope device 5100 (such as in another room or building). In these diagnoses, the information processing unit 5120 then receives and outputs the data. On the basis of the output data, the user of the information processing unit 5120 can make a pathological diagnosis.

(Biological Sample)

The biological sample S may be a sample containing a biological component. The biological component may be a tissue, a cell, a liquid component of the living body (blood, urine, or the like), a culture, or a living cell (a myocardial cell, a nerve cell, a fertilized egg, or the like). The biological sample may be a solid, or may be a specimen fixed with a fixing reagent such as paraffin or a solid formed by freezing. The biological sample can be a section of the solid. A specific example of the biological sample may be a section of a biopsy sample.

The biological sample may be one that has been subjected to a treatment such as staining or labeling. The treatment may be staining for indicating the morphology of the biological component or for indicating the substance (surface antigen or the like) contained in the biological component, and can be hematoxylin-eosin (HE) staining or immunohistochemistry staining, for example. The biological sample may be one that has been subjected to the above treatment with one or more reagents, and the reagent(s) can be a fluorescent dye, a coloring reagent, a fluorescent protein, or a fluorescence-labeled antibody.

The specimen may be prepared from a tissue sample for the purpose of pathological diagnosis or clinical examination. Alternatively, the specimen is not necessarily of the human body, and may be derived from an animal, a plant, or some other material. The specimen may differ in property, depending on the type of the tissue being used (such as an organ or a cell, for example), the type of the disease being examined, the attributes of the subject (such as age, gender, blood type, and race, for example), or the subject's daily habits (such as an eating habit, an exercise habit, and a smoking habit, for example). The specimen may be accompanied by identification information (bar code, QR code (registered trademark), or the like) for identifying each specimen, and be managed in accordance with the identification information.

(Light Irradiation Unit)

The light irradiation unit 5101 is a light source for illuminating the biological sample S, and is an optical unit that guides light emitted from the light source to a specimen. The light source can illuminate a biological sample with visible light, ultraviolet light, infrared light, or a combination thereof. The light source may be one or more of the following: a halogen light source, a laser light source, an LED light source, a mercury light source, and a xenon light source. The light source in fluorescent observation may be of a plurality of types and/or wavelengths, and the types and the wavelengths may be appropriately selected by a person skilled in the art. The light irradiation unit may have a configuration of a transmissive type, a reflective type, or an epi-illumination type (a coaxial epi-illumination type or a side-illumination type).

(Optical Unit)

The optical unit 5102 is designed to guide the light from the biological sample S to the signal acquisition unit 5103. The optical unit may be designed to enable the microscope device 5100 to observe or capture an image of the biological sample S. The optical unit 5102 may include an objective lens. The type of the objective lens may be appropriately selected by a person skilled in the art, in accordance with the observation method. The optical unit may also include a relay lens for relaying an image magnified by the objective lens to the signal acquisition unit. The optical unit may further include optical components other than the objective lens and the relay lens, and the optical components may be an eyepiece, a phase plate, a condenser lens, and the like. The optical unit 5102 may further include a wavelength separation unit designed to separate light having a predetermined wavelength from the light from the biological sample S. The wavelength separation unit may be designed to selectively cause light having a predetermined wavelength or a predetermined wavelength range to reach the signal acquisition unit. The wavelength separation unit may include one or more of the following: a filter, a polarizing plate, a prism (Wollaston prism), and a diffraction grating that selectively pass light, for example. The optical component(s) included in the wavelength separation unit may be disposed in the optical path from the objective lens to the signal acquisition unit, for example. The wavelength separation unit is provided in the microscope device in a case where fluorescent observation is performed, or particularly, where an excitation light irradiation unit is included. The wavelength separation unit may be designed to separate fluorescence or white light from fluorescence.

(Signal Acquisition Unit)

The signal acquisition unit 5103 may be designed to receive light from the biological sample S, and convert the light into an electrical signal, or particularly, into a digital electrical signal. The signal acquisition unit may be designed to be capable of acquiring data about the biological sample S, on the basis of the electrical signal. The signal acquisition unit may be designed to be capable of acquiring data of an image (a captured image, or particularly, a still image, a time-lapse image, or a moving image) of the biological sample S, or particularly, may be designed to acquire data of an image enlarged by the optical unit. The signal acquisition unit includes one or more image sensors, CMOSs, CCDs, or the like that include a plurality of pixels arranged in one- or two-dimensional manner. The signal acquisition unit may include an image sensor for acquiring a low-resolution image and an image sensor for acquiring a high-resolution image, or may include an image sensor for sensing for AF or the like and an image sensor for outputting an image for observation or the like. The image sensor may include not only the plurality of pixels, but also a signal processing unit (including one or more of the following: a CPU, a DSP, and a memory) that performs signal processing using pixel signals from the respective pixels, and an output control unit that controls outputting of image data generated from the pixel signals and processed data generated by the signal processing unit. The image sensor including the plurality of pixels, the signal processing unit, and the output control unit can be preferably designed as a one-chip semiconductor device. Note that the microscope system 5000 may further include an event detection sensor. The event detection sensor includes a pixel that photoelectrically converts incident light, and may be designed to detect that a change in the luminance of the pixel exceeds a predetermined threshold, and regard the change as an event. The event detection sensor may be of an asynchronous type.

(Control Unit)

The control unit 5110 controls imaging being performed by the microscope device 5100. For the imaging control, the control unit can drive movement of the optical unit 5102 and/or the sample placement unit 5104, to adjust the positional relationship between the optical unit and the sample placement unit. The control unit 5110 can move the optical unit and/or the sample placement unit in a direction toward or away from each other (in the optical axis direction of the objective lens, for example). The control unit may also move the optical unit and/or the sample placement unit in any direction in a plane perpendicular to the optical axis direction. For the imaging control, the control unit may control the light irradiation unit 5101 and/or the signal acquisition unit 5103.

(Sample Placement Unit)

The sample placement unit 5104 may be designed to be capable of securing the position of a biological sample on the sample placement unit, and may be a so-called stage. The sample placement unit 5104 may be designed to be capable of moving the position of the biological sample in the optical axis direction of the objective lens and/or in a direction perpendicular to the optical axis direction.

(Information Processing Unit)

The information processing unit 5120 can acquire, from the microscope device 5100, data (imaging data or the like) acquired by the microscope device 5100. The information processing unit can perform image processing on the imaging data. The image processing may include an unmixing process, or more specifically, a spectral unmixing process. The unmixing process may include a process of extracting data of the optical component of a predetermined wavelength or in a predetermined wavelength range from the imaging data to generate image data, or a process of removing data of the optical component of a predetermined wavelength or in a predetermined wavelength range from the imaging data. The image processing may also include an autofluorescence separation process for separating the autofluorescence component and the dye component of a tissue section, and a fluorescence separation process for separating wavelengths between dyes having different fluorescence wavelengths from each other. The autofluorescence separation process may include a process of removing the autofluorescence component from image information about another specimen, using an autofluorescence signal extracted from one specimen of the plurality of specimens having the same or similar properties. The information processing unit 5120 may transmit data for the imaging control to the control unit 5110, and the control unit 5110 that has received the data may control the imaging being by the microscope device 5100 in accordance with the data.

The information processing unit 5120 may be designed as an information processing device such as a general-purpose computer, and may include a CPU, RAM, and ROM. The information processing unit may be included in the housing of the microscope device 5100, or may be located outside the housing. Further, the various processes or functions to be executed by the information processing unit may be realized by a server computer or a cloud connected via a network.

The method to be implemented by the microscope device 5100 to capture an image of the biological sample S may be appropriately selected by a person skilled in the art, in accordance with the type of the biological sample, the purpose of imaging, and the like. Examples of the imaging method are described below.

One example of the imaging method is as follows. The microscope device can first identify an imaging target region. The imaging target region may be identified so as to cover the entire region in which the biological sample exists, or may be identified so as to cover the target portion (the portion in which the target tissue section, the target cell, or the target lesion exists) of the biological sample. Next, the microscope device divides the imaging target region into a plurality of divided regions of a predetermined size, and the microscope device sequentially captures images of the respective divided regions. As a result, an image of each divided region is acquired.

Figure 23:
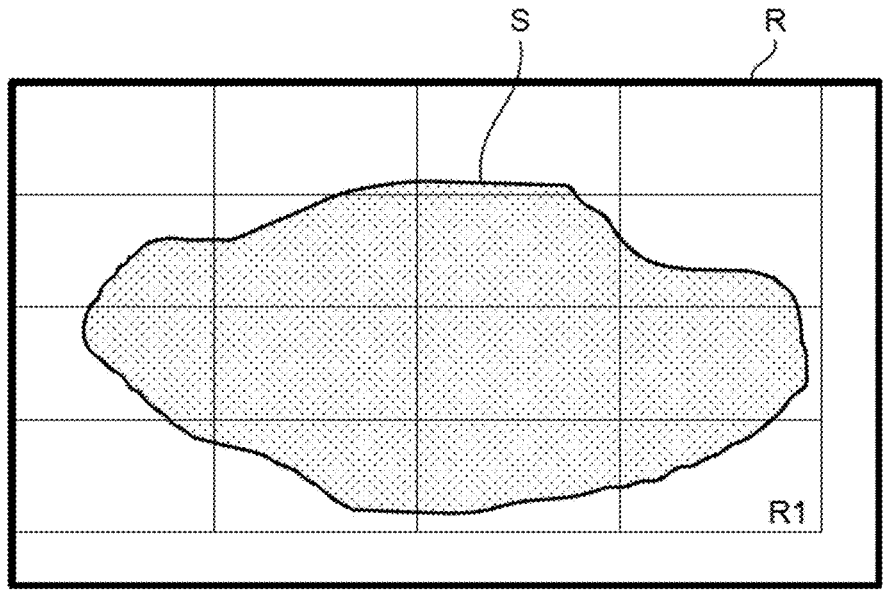
FIG. 23 is a diagram showing an example of an imaging method.

As shown in FIG. 23, the microscope device identifies an imaging target region R that covers the entire biological sample S. The microscope device then divides the imaging target region R into 16 divided regions. The microscope device then captures an image of a divided region R1, and next captures one of the regions included in the imaging target region R, such as an image of a region adjacent to the divided region R1. After that, divided region imaging is performed until images of all the divided regions have been captured. Note that an image of a region other than the imaging target region R may also be captured on the basis of captured image information about the divided regions. The positional relationship between the microscope device and the sample placement unit is adjusted so that an image of the next divided region is captured after one divided region is captured. The adjustment may be performed by moving the microscope device, moving the sample placement unit, or moving both. In this example, the imaging device that captures an image of each divided region may be a two-dimensional image sensor (an area sensor) or a one-dimensional image sensor (a line sensor). The signal acquisition unit may capture an image of each divided region via the optical unit. Further, images of the respective divided regions may be continuously captured while the microscope device and/or the sample placement unit is moved, or movement of the microscope device and/or the sample placement unit may be stopped every time an image of a divided region is captured. The imaging target region may be divided so that the respective divided regions partially overlap, or the imaging target region may be divided so that the respective divided regions do not overlap. A plurality of images of each divided region may be captured while the imaging conditions such as the focal length and/or the exposure time are changed. The information processing device can also generate image data of a wider region by stitching a plurality of adjacent divided regions. As the stitching process is performed on the entire imaging target region, an image of a wider region can be acquired with respect to the imaging target region. Also, image data with a lower resolution can be generated from the images of the divided regions or the images subjected to the stitching process.

Figure 24:
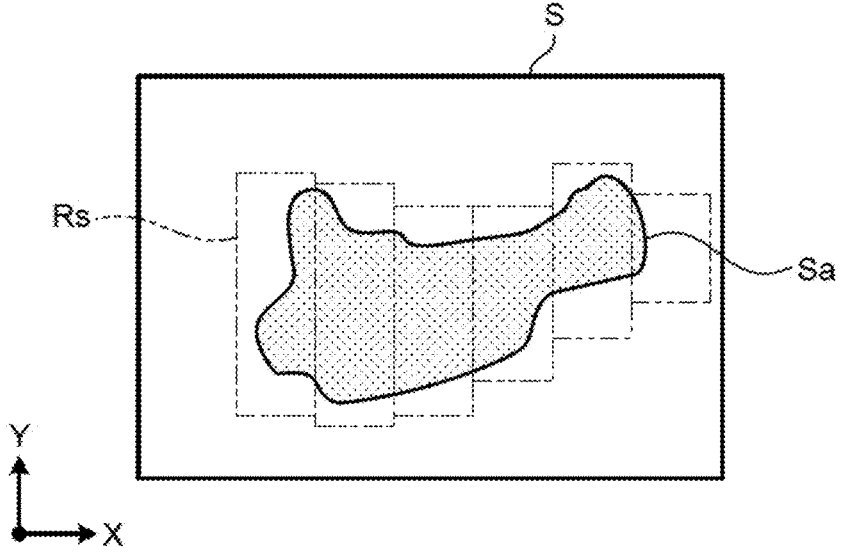
FIG. 24 is a diagram showing an example of an imaging method.

Another example of the imaging method is as follows. The microscope device can first identify an imaging target region. The imaging target region may be identified so as to cover the entire region in which the biological sample exists, or may be identified so as to cover the target portion (the portion in which the target tissue section or the target cell exists) of the biological sample. Next, the microscope device scans a region (also referred to as a "divided scan region") of the imaging target region in one direction (also referred to as a "scan direction") in a plane perpendicular to the optical axis, and thus captures an image. After the scanning of the divided scan region is completed, the divided scan region next to the scan region is then scanned. These scanning operations are repeated until an image of the entire imaging target region is captured. As shown in FIG. 24, the microscope device identifies a region (a gray portion) in which a tissue section of the biological sample S exists, as an imaging target region Sa. The microscope device then scans a divided scan region Rs of the imaging target region Sa in the Y-axis direction. After completing the scanning of the divided scan region Rs, the microscope device then scans the divided scan region that is the next in the X-axis direction. This operation is repeated until scanning of the entire imaging target region Sa is completed. For the scanning of each divided scan region, the positional relationship between the microscope device and the sample placement unit is adjusted so that an image of the next divided scan region is captured after an image of one divided scan region is captured. The adjustment may be performed by moving the microscope device, moving the sample placement unit, or moving both. In this example, the imaging device that captures an image of each divided scan region may be a one-dimensional image sensor (a line sensor) or a two-dimensional image sensor (an area sensor). The signal acquisition unit may capture an image of each divided region via a magnifying optical system. Also, images of the respective divided scan regions may be continuously captured while the microscope device and/or the sample placement unit is moved. The imaging target region may be divided so that the respective divided scan regions partially overlap, or the imaging target region may be divided so that the respective divided scan regions do not overlap. A plurality of images of each divided scan region may be captured while the imaging conditions such as the focal length and/or the exposure time are changed. The information processing device can also generate image data of a wider region by stitching a plurality of adjacent divided scan regions. As the stitching process is performed on the entire imaging target region, an image of a wider region can be acquired with respect to the imaging target region. Also, image data with a lower resolution can be generated from the images of the divided scan regions or the images subjected to the stitching process.

<5. Configuration Example of Hardware>

Figure 25:
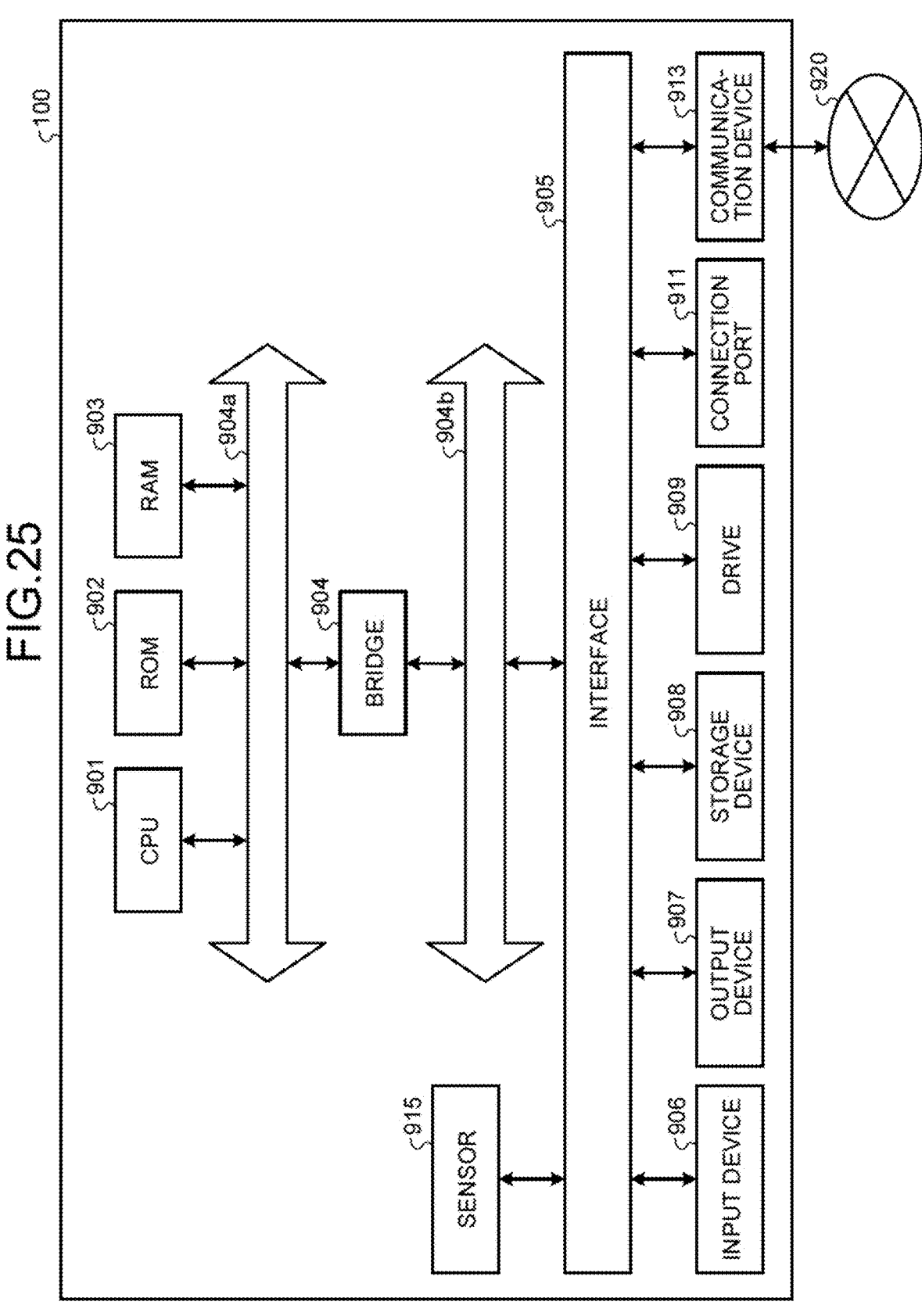
FIG. 25 is a diagram showing an example of a schematic configuration of hardware of an information processing device.

A hardware configuration example of the information processing device 100 according to each embodiment (or each modification) will be described with reference to FIG. 25. FIG. 25 is a block diagram showing an example of a schematic configuration of hardware of the information processing device 100. Various processes by the information processing device 100 are implemented, for example, by cooperation of software and hardware described below.

As shown in FIG. 25, the information processing device 100 includes a central processing unit (CPU) 901, a read only memory (ROM) 902, a random access memory (RAM) 903, and a host bus 904a. Furthermore, the information processing device 100 includes a bridge 904, an external bus 904b, an interface 905, an input device 906, an output device 907, a storage device 908, a drive 909, a connection port 911, a communication device 913, and a sensor 915. The information processing device 100 may include a processing circuit such as a DSP or an ASIC instead of or in addition to the CPU 901.

The CPU 901 functions as an arithmetic processing device and a control device, and controls the overall operation in the information processing device 100 according to various programs. In addition, the CPU 901 may be a microprocessor. The ROM 902 stores programs, operation parameters, and the like used by the CPU 901. The RAM 903 primarily stores programs used in the execution of the CPU 901, parameters that appropriately change in the execution, and the like. The CPU 901 can embody, for example, at least the processing unit 130 and the control unit 150 of the information processing device 100.

The CPU 901, the ROM 902, and the RAM 903 are mutually connected by a host bus 904a including a CPU bus and the like. The host bus 904a is connected to the external bus 904b such as a peripheral component interconnect/ interface (PCI) bus via the bridge 904. Note that the host bus 904a, the bridge 904, and the external bus 904b do not necessarily need to be configured separately, and these functions may be mounted on one bus.

The input device 906 is implemented by, for example, a device to which information is input by an implementer, such as a mouse, a keyboard, a touch panel, a button, a microphone, a switch, and a lever. Furthermore, the input device 906 may be, for example, a remote control device using infrared rays or other radio waves, or may be an external connection device such as a mobile phone or a PDA corresponding to the operation of the information processing device 100. Furthermore, the input device 906 may include, for example, an input control circuit that generates an input signal on the basis of information input by the implementer using the above input units and outputs the input signal to the CPU 901. By operating the input device 906, the implementer can input various data to the information processing device and instruct the information processing device 100 to perform a processing operation. The input device 906 can embody at least the operating unit 160 of the information processing device 100, for example.

The output device 907 is formed by a device capable of visually or audibly notifying the implementer of acquired information. Examples of such a device include a display device such as a CRT display device, a liquid crystal display device, a plasma display device, an EL display device, and a lamp, a sound output device such as a speaker and a headphone, and a printer device. The output device 907 can embody at least the display unit 140 of the information processing device 100, for example.

The storage device 908 is a device for storing data. The storage device 908 is achieved by, for example, a magnetic storage device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. The storage device 908 stores programs and various data executed by the CPU 901, various data acquired from the outside, and the like. The storage device 908 can embody at least the storage unit 120 of the information processing device 100, for example.

The drive 909 is a reader/writer for a storage medium, and is built in or externally attached to the information processing device 100. The drive 909 reads information recorded in a removable storage medium such as a mounted magnetic disk, optical disk, magneto-optical disk, or semiconductor memory, and outputs the information to the RAM 903. Furthermore, the drive 909 can also write information to a removable storage medium.

The connection port 911 is an interface connected to an external device, and is a connection port to an external device capable of transmitting data by, for example, a universal serial bus (USB).

The communication device 913 is, for example, a communication interface formed by a communication device or the like for connecting to the network 920. The communication device 913 is, for example, a communication card for wired or wireless local area network (LAN), long term evolution (LTE), Bluetooth (registered trademark), wireless USB (WUSB), or the like. Furthermore, the communication device 913 may be a router for optical communication, a router for asymmetric digital subscriber line (ADSL), a modem for various types of communication, or the like. For example, the communication device 913 can transmit and receive signals and the like to and from the Internet and other communication devices according to a predetermined protocol such as TCP/IP.

In the present embodiment, the sensor 915 includes a sensor capable of acquiring a spectrum (for example, an imaging element or the like), but may include another sensor (for example, an acceleration sensor, a gyro sensor, a geomagnetic sensor, a pressure-sensitive sensor, a sound sensor, a distance measuring sensor, or the like). The sensor 915 can embody at least the image acquisition unit 112 of the information processing device 100, for example.

Note that the network 920 is a wired or wireless transmission path of information transmitted from a device connected to the network 920. For example, the network 920 may include a public network such as the Internet, a telephone network, or a satellite communication network, various local area networks (LANs) including Ethernet (registered trademark), a wide area network (WAN), or the like. In addition, the network 920 may include a dedicated line network such as an Internet protocol-virtual private network (IP-VPN).

The hardware configuration example capable of implementing the functions of the information processing device 100 has been described above. Each of the above-described components may be implemented using a general-purpose member, or may be implemented by hardware specialized for the function of each component. Therefore, it is possible to appropriately change the hardware configuration to be used according to the technical level at the time of implementing the present disclosure.

Note that a computer program for implementing each function of the information processing device 100 as described above can be created and mounted on a PC or the like. Furthermore, it is also possible to provide a computer-readable recording medium storing such a computer program. The recording medium is, for example, a magnetic disk, an optical disk, a magneto-optical disk, a flash memory, or the like. In addition, the computer program described above may be distributed via, for example, a network without using the recording medium.

<6. Appendix>

Note that the present technology can also have the following configurations.

(1)

An information processing device, comprising:

a simulated image generation unit that generates a simulated image by superimposing a non-stained image including an autofluorescence component and a dye tile image in which a reference spectrum of a first fluorescent dye and imaging noise of each of pixels of the non-stained image are associated;

a fluorescence separation unit that separates a component of the first fluorescent dye and the autofluorescence component on the basis of the simulated image and generates a separated image; and an evaluation unit that evaluates a degree of separation of the separated image.

(2)

The information processing device according to (1), wherein the dye tile image includes a reference spectrum of a second fluorescent dye in addition to the first fluorescent dye, and is an image in which the reference spectrum of each of the first fluorescent dye and the second fluorescent dye and the imaging noise of each of the pixels of the non-stained image are associated.

(3)

The information processing device according to (1) or (2), wherein the imaging noise is noise that changes according to an imaging condition of the non-stained image.

(4)

The information processing device according to (3), wherein the imaging condition of the non-stained image includes at least one or all of laser power, gain, and exposure time.

(5)

The information processing device according to any one of (1) to (4), wherein the dye tile image is a dye tile group having a plurality of dye tiles.

(6)

The information processing device according to (5), wherein a size of each of the plurality of dye tiles is same as a size of a cell.

(7)

The information processing device according to (5) or (6), wherein the plurality of dye tiles is arranged in a predetermined color arrangement pattern.

(8)

The information processing device according to any one of (5) to (7), wherein a degree of the imaging noise is quantified or visualized for each of the dye tiles.

(9)

The information processing device according to any one of (5) to (8), wherein the simulated image generation unit repeatedly arranges the dye tiles corresponding to a number of dyes designated by a user, and generates the dye tile image.

(10)

The information processing device according to any one of (5) to (9), wherein the simulated image generation unit mixes a plurality of dyes and creates the dye tile.

(11)

The information processing device according to any one of (1) to (10), wherein the simulated image generation unit determines spectral intensity of a dye to be imparted to autofluorescence intensity of the non-stained image.

(12)

The information processing device according to any one of (1) to (11), wherein the simulated image generation unit superimposes the imaging noise on a reference spectrum of the first fluorescent dye.

(13)

The information processing device according to (12), wherein the imaging noise is shot noise.

(14)

The information processing device according to any one of (1) to (13), wherein the fluorescence separation unit separates the component of the first fluorescent dye and the autofluorescence component by color separation calculation including at least one of a least squares method, a weighted least squares method, or non-negative matrix factorization.

(15)

The information processing device according to any one of (1) to (14), wherein the evaluation unit generates a histogram from the separated image, calculates a signal separation value between a dye and a signal other than the dye from the histogram, and evaluates the degree of separation on the basis of the signal separation value.

(16)

The information processing device according to any one of (1) to (15), further comprising:

a recommendation unit that recommends an optimal reagent corresponding to a dye designated by a user on the basis of the degree of separation.

(17)

The information processing device according to (16), wherein the recommendation unit generates an image indicating a combination of dyes or a combination of a dye and the reagent.

(18)

The information processing device according to (16), wherein the recommendation unit generates an image indicating a combination of an antibody and a dye.

(19)

A biological sample observation system, comprising:

an imaging device that acquires a non-stained image including an autofluorescence component; and an information processing device that processes the non-stained image, wherein the information processing device includes a simulated image generation unit that generates a simulated image by superimposing the non-stained image and a dye tile image in which a reference spectrum of a first fluorescent dye and imaging noise of each of pixels of the non-stained image are associated, a fluorescence separation unit that separates a component of the first fluorescent dye and the autofluorescence component on the basis of the simulated image and generates a separated image, and an evaluation unit that evaluates a degree of separation of the separated image.

(20)

An image generation method, comprising generating a simulated image by superimposing a non-stained image including an autofluorescence component and a dye tile image in which a reference spectrum of a first fluorescent dye and imaging noise of each of pixels of the non-stained image are associated.

(21)

A biological sample observation system including the information processing device according to any one of (1) to (18).

(22)

An image generation method for generating an image by the information processing device according to any one of (1) to (18).

REFERENCE SIGNS LIST

1 OBSERVATION UNIT
2 PROCESS UNIT
3 DISPLAY UNIT
10 EXCITATION UNIT
10A FLUORESCENT REAGENT
11A REAGENT IDENTIFICATION INFORMATION
20 STAGE
20A SPECIMEN
21 STORING UNIT
21A SPECIMEN IDENTIFICATION INFORMATION
22 DATA CALIBRATION UNIT
23 IMAGE FORMATION UNIT
30 SPECTRAL IMAGING UNIT
30A FLUORESCENCE STAINED SPECIMEN
40 OBSERVATION OPTICAL SYSTEM
50 SCANNING MECHANISM
60 FOCUS MECHANISM
70 NON-FLUORESCENCE OBSERVING UNIT
80 CONTROL UNIT
100 INFORMATION PROCESSING DEVICE
110 ACQUISITION UNIT
111 INFORMATION ACQUISITION UNIT
112 IMAGE ACQUISITION UNIT
120 STORAGE UNIT
121 INFORMATION STORAGE UNIT
122 IMAGE INFORMATION STORAGE UNIT
123 ANALYSIS RESULT STORAGE UNIT
130 PROCESSING UNIT
131 ANALYSIS UNIT
131$a$ SIMULATED IMAGE GENERATION UNIT
131$b$ FLUORESCENCE SEPARATION UNIT
131$c$ EVALUATION UNIT
131$d$ RECOMMENDATION UNIT
132 IMAGE GENERATION UNIT
140 DISPLAY UNIT
150 CONTROL UNIT
160 OPERATING UNIT
200 DATABASE
500 FLUORESCENCE OBSERVATION APPARATUS
1311 CONNECTION UNIT
1321 COLOR SEPARATION UNIT
1321$a$ FIRST COLOR SEPARATION UNIT
1321$b$ SECOND COLOR SEPARATION UNIT
1322 SPECTRUM EXTRACTION UNIT
5000 MICROSCOPE SYSTEM
5100 MICROSCOPE DEVICE
5101 LIGHT IRRADIATION UNIT
5102 OPTICAL UNIT
5103 SIGNAL ACQUISITION UNIT
5104 SAMPLE PLACEMENT UNIT
5110 CONTROL UNIT
5120 INFORMATION PROCESSING UNIT

The invention claimed is:

1. An information processing device, comprising:

a simulated image generation unit that generates a simulated image by superimposing a non-stained image including an autofluorescence component and a dye tile image in which a reference spectrum of a first fluorescent dye and imaging noise of each of pixels of the non-stained image are associated;

a fluorescence separation unit that separates a component of the first fluorescent dye and the autofluorescence component on the basis of the simulated image and generates a separated image; and an evaluation unit that evaluates a degree of separation of the separated image.

2. The information processing device according to claim 1, wherein the dye tile image includes a reference spectrum of a second fluorescent dye in addition to the first fluorescent dye, and is an image in which the reference spectrum of each of the first fluorescent dye and the second fluorescent dye and the imaging noise of each of the pixels of the non-stained image are associated.

3. The information processing device according to claim 1, wherein the imaging noise is noise that changes according to an imaging condition of the non-stained image.

4. The information processing device according to claim 3, wherein the imaging condition of the non-stained image includes at least one or all of laser power, gain, and exposure time.

5. The information processing device according to claim 1, wherein the dye tile image is a dye tile group having a plurality of dye tiles.

6. The information processing device according to claim 5, wherein a size of each of the plurality of dye tiles is same as a size of a cell.

7. The information processing device according to claim 5, wherein the plurality of dye tiles is arranged in a predetermined color arrangement pattern.

8. The information processing device according to claim 5, wherein a degree of the imaging noise is quantified or visualized for each of the dye tiles.

9. The information processing device according to claim 5, wherein the simulated image generation unit repeatedly arranges the dye tiles corresponding to a number of dyes designated by a user, and generates the dye tile image.

10. The information processing device according to claim 5, wherein the simulated image generation unit mixes a plurality of dyes and creates the dye tile.

11. The information processing device according to claim 1, wherein the simulated image generation unit determines spectral intensity of a dye to be imparted to autofluorescence intensity of the non-stained image.

12. The information processing device according to claim 1, wherein the simulated image generation unit superimposes the imaging noise on a reference spectrum of the first fluorescent dye.

13. The information processing device according to claim 12, wherein the imaging noise is shot noise.

14. The information processing device according to claim 1, wherein the fluorescence separation unit separates the component of the first fluorescent dye and the autofluorescence component by color separation calculation including at least one of a least squares method, a weighted least squares method, or non-negative matrix factorization.

15. The information processing device according to claim 1, wherein the evaluation unit generates a histogram from the separated image, calculates a signal separation value between a dye and a signal other than the dye from the histogram, and evaluates the degree of separation on the basis of the signal separation value.

16. The information processing device according to claim 1, further comprising:

a recommendation unit that recommends an optimal reagent corresponding to a dye designated by a user on the basis of the degree of separation.

17. The information processing device according to claim 16, wherein the recommendation unit generates an image indicating a combination of dyes or a combination of a dye and the reagent.

18. The information processing device according to claim 16, wherein the recommendation unit generates an image indicating a combination of an antibody and a dye.

19. A biological sample observation system, comprising:

an imaging device that acquires a non-stained image including an autofluorescence component; and an information processing device that processes the non-stained image, wherein the information processing device includes a simulated image generation unit that generates a simulated image by superimposing the non-stained image and a dye tile image in which a reference spectrum of a first fluorescent dye and imaging noise of each of pixels of the non-stained image are associated, a fluorescence separation unit that separates a component of the first fluorescent dye and the autofluorescence component on the basis of the simulated image and generates a separated image, and an evaluation unit that evaluates a degree of separation of the separated image.

20. An image generation method, comprising generating a simulated image by superimposing a non-stained image including an autofluorescence component and a dye tile image in which a reference spectrum of a first fluorescent dye and imaging noise of each of pixels of the non-stained image are associated;

separating a component of the first fluorescent dye and the autofluorescence component on the basis of the simulated image and generates a separated image; and evaluating a degree of separation of the separated image.

* * * * *